RALPH F. WUERKER
ROBERT V. LANGMUIR
INVENTORS

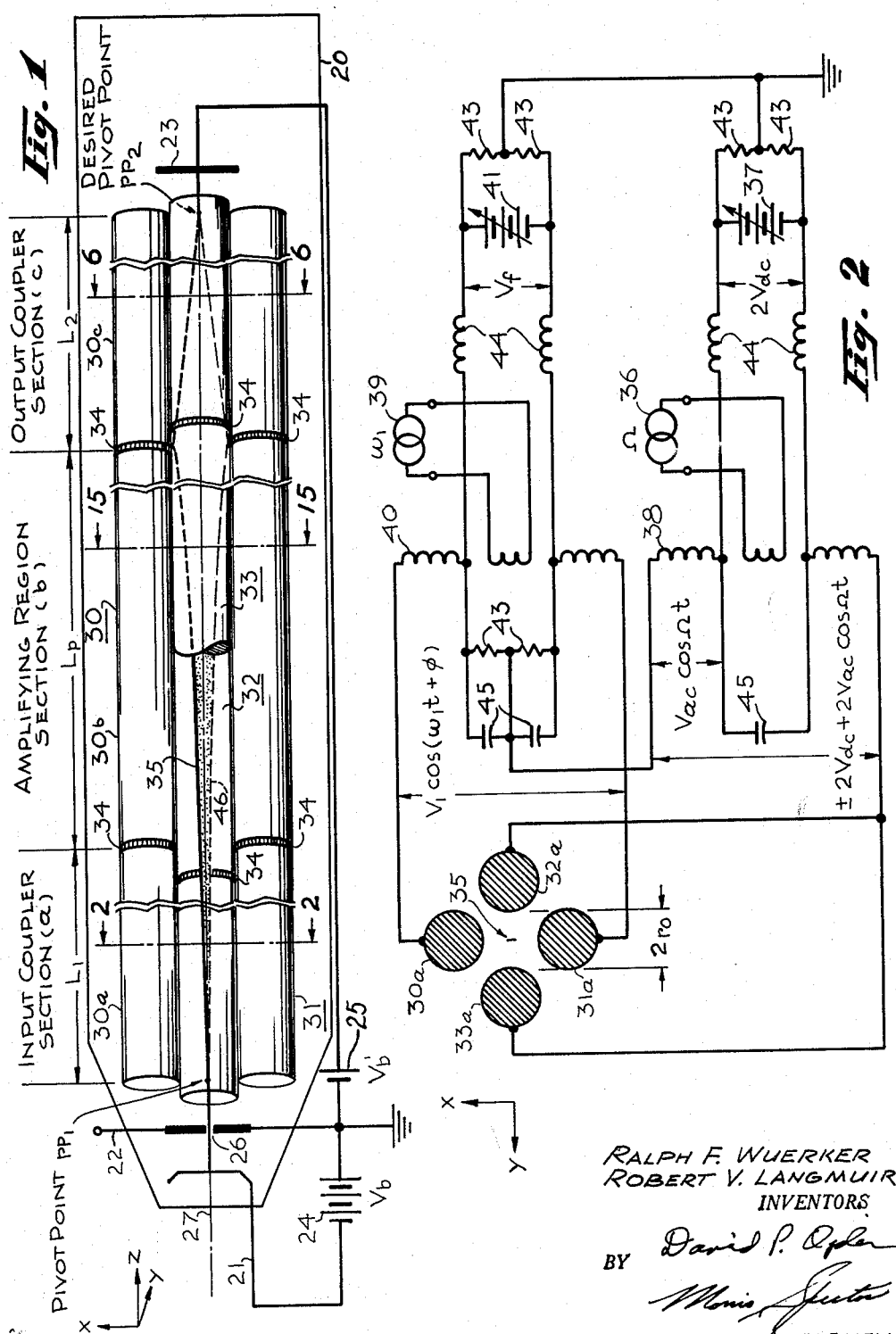

BY

ATTORNEYS

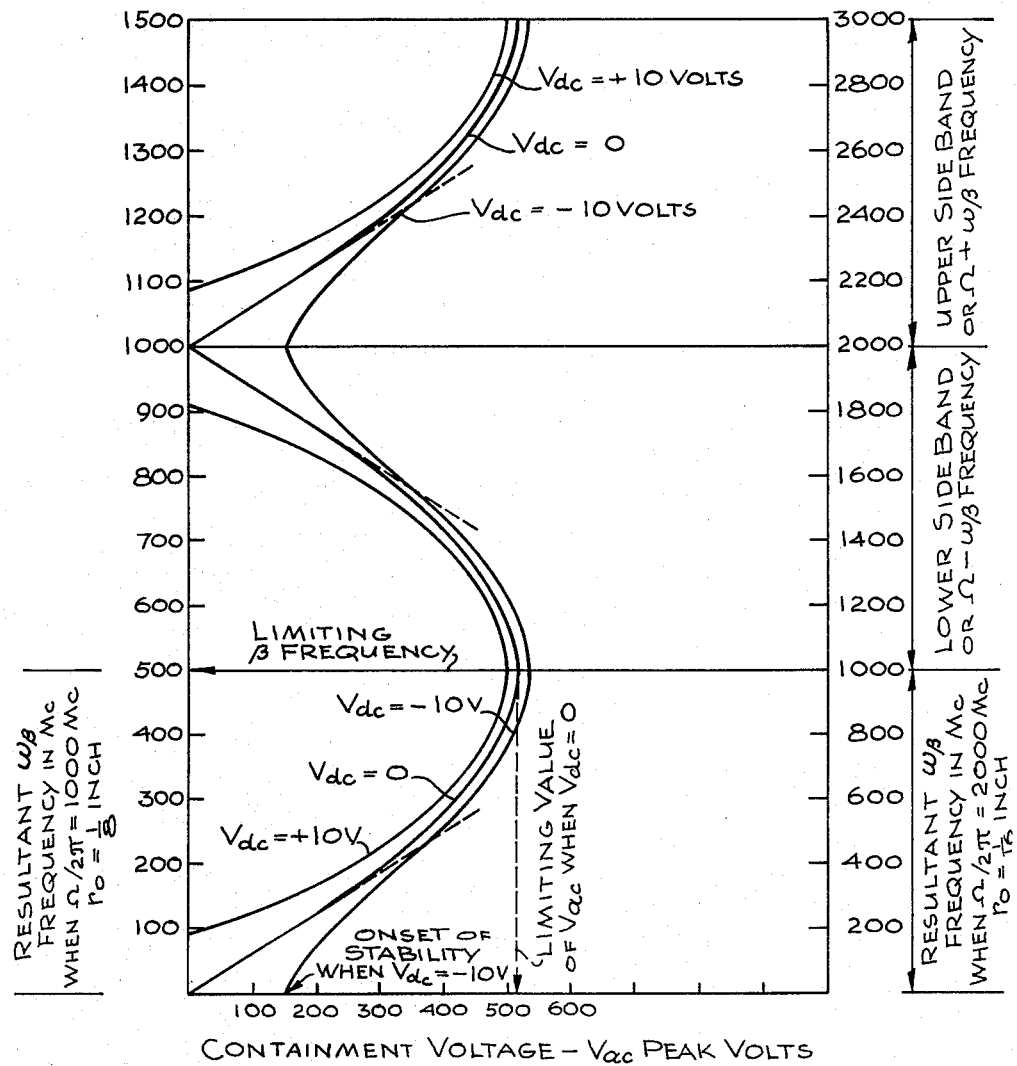

RALPH F. WUERKER
ROBERT V. LANGMUIR
INVENTORS

BY
ATTORNEYS

RALPH F. WUERKER
ROBERT V. LANGMUIR
INVENTORS

RALPH F. WUERKER
ROBERT V. LANGMUIR
INVENTORS

BY David P. Ogden
Morris Liss
ATTORNEYS

RALPH F. WUERKER
ROBERT V. LANGMUIR
INVENTOR.

BY

ATTORNEYS

United States Patent Office 3,147,445
Patented Sept. 1, 1964

3,147,445
QUADRUPOLE FOCUSING MEANS FOR
CHARGED PARTICLE CONTAINMENT
Ralph F. Wuerker, Palos Verdes Estates, and Robert V. Langmuir, Altadena, Calif., assignors to Thompson Ramo Wooldridge Inc., Los Angeles, Calif., a corporation of Ohio
Filed Nov. 5, 1959, Ser. No. 851,055
45 Claims. (Cl. 330—4.7)

This invention relates to a charged particle transverse beam tube and more specifically to a vacuum tube wherein an electron beam may be contained along the longitudinal axis thereof while high frequently energy is added to and/or taken from the transverse deflection of the beam.

In the art of electron beam vacuum tubes it is possible to impart energy to a transverse motion of an electron beam. One known arrangement for accomplishing this passes the beam between parallel plates energized to provide an electrostatic field whereby the electrons will be accelerated transversely in the direction of the field between the plates and thus energy passes between the plates and the beam. This type of system is exemplified by electrostatic deflection systems used in oscilloscopes. On the other hand, if the voltage applied to the deflection plates is an alternating voltage at a relatively high frequency on the order of 100 to 1000 megacycles, such that the electron passing through the deflection system encounters an oscillating electric field, a positive field of one half cycle causing the transverse motion of the electron may be at least partially counteracted by a negative field during a next half cycle whereby the output transverse location and velocity of the beam are substantially indeterminable.

One approach to the problem of coherently coupling energy onto an electron beam with a high frequency signal utilizes a known coupler employing a cyclotron or an omegatron resonance in a longitudinal magnetic field. Thus successive cycles of input power add to the transverse energy of the beam resulting in a spiral motion. Such a coupler requires an extensive longitudinal magnetic field. The provision of such a longitudinal magnetic field is difficult in a simple beam coupler and in a more complex system such a longitudinal magnetic field requires very heavy and expensive equipment.

Therefore, an object of the present invention is to provide a simple and reliable transverse beam modulating device which does not rely on magnetic fields.

Another object of the invention is to provide an improved electron beam coupler device.

Another object of the present invention is to provide a simple and low noise beam isolator wherein the beam is electrodynamically contained throughout its transversal of the coupling region.

Another object of the present invention is to provide a transverse beam tube operable as a unidirectional voltage tunable device.

A further object of the present invention is to provide an improved low noise frequency converter.

Another object of the present invention is to provide an improved low noise electronic amplifier.

A still further object of the present invention is to provide a frequency controllable oscillator.

In accordance with one embodiment of the present invention an electron source and focusing arrangement causes an electron beam to enter a beam modulating region of a vacuum tube defined by an electrode structure including two pairs of spaced-apart, elongated, parallel electrodes which are energized at a frequency and voltage that will provide a transverse electrodynamic two dimensional focusing field containment of the electron beam.

The pairs of spaced-apart electrodes are arranged in a quadrupole system parallel to the longitudinal axis of the tube along which the electron beam moves. Proper selection of the voltages energizing the pairs of electrodes will contain the electron beam about the longitudinal axis of the quadrupole system. In order to impart signal energy to the electron beam resulting in "harmonic" transverse motion of the electron beam, a transverse electrodynamic signal field is applied perpendicular to the longitudinal axis of the quadrupole system. The frequency of the driving signal voltage is dependent upon both the frequency and voltages used to contain the beam.

Energizing of the beam imparts oscillatory transverse displacement energy to the beam. Such energy can then be absorbed by a load device connected to an output section of the system. Such a combination may be operated as a coupler, as an oscillator, as an isolator, or as a frequency converter, depending upon the particular types of electric circuit means connected to the beam tube. In addition, the present invention suggests several arrangements for amplifying any initial transverse oscillations in another or amplifying section. As will be appreciated from the following discussion, the separate functional sections of the quadrupole system are normally isolated with respect to the transverse energy signal fields applied thereto. In this way it becomes feasible to operate the quadrupole system as one of several possible electronic devices.

More simply stated, a low speed charged particle beam is bound (contained) in the orthogonal transverse directions to the longitudinal axis of the present invention by an alternating quadrupole electric field having a frequency $\Omega$ selected to create a deep "voltage trough" which binds the beam tightly to the axis. Next, transverse signal frequency energy is applied to the beam to cause it to oscillate as a unit about the axis. The relationships between the containment voltages and the signal frequency $\omega$ are such that they will cause the excited beam to oscillate about the axis in much the same manner as a rigid pendulum vibrates at a specific frequency in a gravitational field.

Because of the extensive mathematical treatment of phenomena relevant to the present invention, an index of the definitions of important terminology appearing in the following discussion is presented here. Many of the following terms are also used repeatedly as subscripts.

$A$ = constant of integration;
$a_u$, $a_x$, $a_y$ = normalized parameter specifying the static quadrupole electric fields (see FIG. 3);
$B$ = constant of integration;
$C_{2n}$, $C_0$ = coefficients in the normalized solution of the Mathieu equations of motion;
$E$ = transverse alternating electric field (volts/meter);
$F$ = normalized transverse steering force;
$e/m$ = charge to mass ratio of the charged particles (coulombs/kilogram);
exp = base of the natural system of logarithms (2.718 . . .);
$i_b$ = beam current (amperes);
$L$ = length of a functional section (meters);
$n$ = an integer;
$P_{(a)}$ = power absorbed by the input coupler section ($a$) (watts);
$P_{(c)}$ = power supplied by the output coupler section ($c$) (watts);
$pp$ = pivot point of the beam;
$q$, $q_u$, $q_x$, $q_y$ = normalized parameter specifying the alternating quadrupole electric containment field (see FIG. 3);
$R_{(a)}$, $R_{(c)}$ = coupler section transverse beam resistance (ohms);

$R_s$ = external load impedance (ohms);
$r_0$ = one-half the electrode separation (meters);
$t$ = time, the independent variable (seconds);
$U(t)$ = particular solution in the $u$ direction as a function of time;
$u$ = either $x$ or $y$ directions (meters);
$V$, $V_1$, $V_2$, $V_\omega$, $V_{1x}$, etc. = signal voltage measured across input or output terminals (volts peak) at frequencies $\omega_1$, $\omega_x$, etc.;
$V_{ac}$ = alternating containment quadrupole voltage (volts peak);
$V_b$ = electron gun accelerating voltage (volts);
$V_b'$ = collector voltage (volts);
$V_{dc}$ = unidirectional frequency control quadrupole voltage (volts);
$V_{dc_D}$ = unidirectional defocusing control voltage (volts);
$V_{eff}$ = the effective confinement potential (volts);
$V_f$ = unidirectional beam steering voltage (volts);
$V_p$ = alternating pumping or amplifying voltage (volts peak);
$v_x$, $v_y$, $v_z$ = beam velocity (meters/second);
$X(z, t)$ = particular displacement in the x direction as function $z$ and $t$ (meters);
$x$ = one of the independent transverse displacements of the beam (meters); (also used as a subscript indicating the $x$ component);
$y$ = the other independent displacement of the beam orthogonal to $x$ (meters); (also used as a subscript indicating the $y$ component);
$Z_b$ = longitudinal beam impedance = $V_b/i_b$ (ohms);
$z$ = displacement along the longitudinal axis of the system (meters); (also used as a subscript indicating the $z$ component);
$\Omega$ = angular frequency of the containing quadrupole field (radians/second);
$\xi$ = normalized time ($\xi = \Omega t/2$);
$\beta$, $\beta_u$, $\beta_x$, $\beta_y$ = normalized resultant frequency of oscillation;
$\omega$, $\omega_\beta$, $\omega_x$, $\omega_y$, etc. = the resultant angular frequency of transverse oscillation ($\omega_u = \beta\Omega/2$) (radians/second);
$\psi$ = phase angle (radians);
$\phi$ = phase angle (radians);

$\nabla^2$ = the operator $\left(\nabla^2 = \dfrac{\partial^2}{\partial x^2} + \dfrac{\partial^2}{\partial y^2} + \dfrac{\partial^2}{\partial z^2}\right)$;

$\gamma$ = coupling coefficient = $\left(\gamma = \dfrac{E_1}{V_1} r_0\right)$;

*Subscripts*

($a$), as in $P_{(a)}$ and $R_{(a)}$ = input section function;
($c$), as in $P_{(c)}$ and $R_{(c)}$ = output section function;
$p$, as in $E_p$, $L_p$, and $V_p$ = amplifier or pumping function;
1, as in $V_1$, $pp_1$, and $L_1$ = input section quantity;
2, as in $V_2$, $pp_2$, and $L_2$ = output section quantity.

The subject matter which is regarded as this invention is particularly pointed out and distinctly claimed in the concluding portion of this specification. The invention, however, as to its organization and operation, together with further objects and advantages thereof will best be understood by reference to the following description taken in connection with the accompanying drawings, in which:

FIGURE 1 is a schematic side view, partly broken away, of one embodiment of the present invention;

FIG. 2 is a cross-sectional view of a driving or input coupler section of the charged particle beam tube taken along line 2—2 of FIG. 1 and shows schematically necessary external electric circuit connections;

FIG. 4 is a curve showing relationships between the containment voltages and the dominant signal frequencies using two different containment frequencies and electrode spacings;

Figure 3:
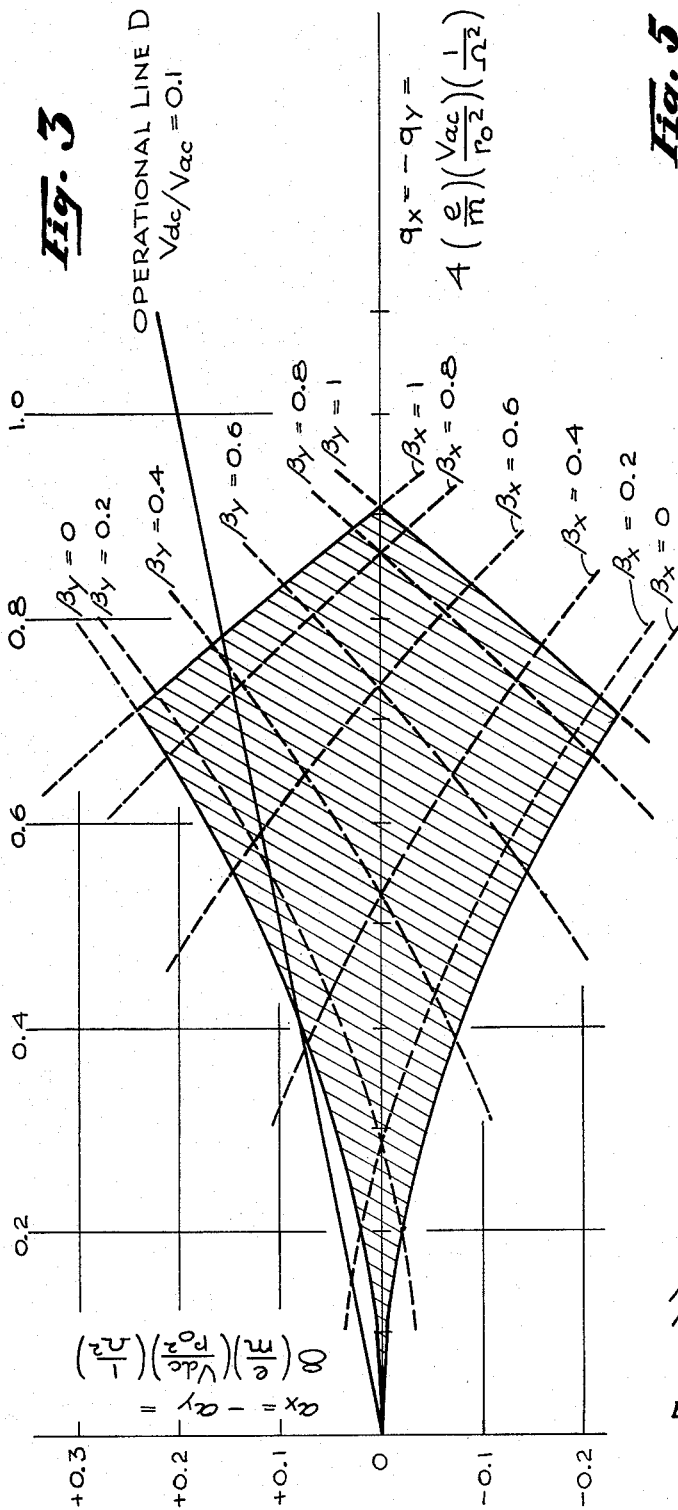
FIG. 3 is the stability diagram indicating for the present invention the most desired region of stable containment of the charged particle beam by the quadrupole electric fields.

Because of the complexity of the present invention, the following descriptive gravational model should greatly clarify the electronic phenomena described in the following specification. By way of example, first take a piece of sheet metal bent into a smooth trough ($a$) (not shown) so that in cross section it has an inner surface in the form of a parabola or semicircle. The trough ($a$) is then placed on a horizontal table, and a marble or small sphere is placed upon the inner surface of the trough. One first notes that if the marble is pushed away from the lowest portion (the longitudinal axis) and released, it will oscillate back and forth at a frequency ($\omega/2\pi$) determined by the profile of the trough ($a$) and gravity. If the marble is next given a push along the longitudinal axis, it will roll along the trough and will (if excited or pushed away from the axis) oscillate to and fro perpendicular (transverse) to its longitudinal direction of motion. In essence, the trough ($a$) is a gravitational analog to the average effect of the alternating quadrupole containment electric field of the present invention. The transverse oscillation of the marble is equivalent to the resultant ($\beta$) signal oscillations which a single excited electron will execute as it progresses along the containment electrode structure.

Next, rather than a single marble, a "beam" of marbles is directed along the trough ($a$) from a hopper or source connected thereto by an inclined plane. The inclined plane is equivalent to an accelerating force. Thus, when a gate on the hopper is released, the marbles roll down the chute at the center of the trough ($a$). They then progress one after another down the center of the trough ($a$). Now that the machine is running, the marble beam can next be excited in the same manner that a transverse electric field ($E_1$) excites an electron beam in the input section (a) of the present invention. In the gravitational model this is done by slightly rocking the trough ($a$)

back and forth while the marble beam progresses along it. It is soon seen that the marble beam can be caused to oscillate as a unit (coherently) when the frequency at which we rock the trough (a) equals the natural frequency of the oscillation of a single marble. The amplitude or maximum displacement of each marble increases as it rolls along the rocking trough (a) and gains more and more energy per cycle. Looking down from above, the marble beam has the appearance of an oscillating rigid bar (i.e., a pendulum) which pivots about the point where the inclined plane injects the marbles into the trough (a).

An output coupler section (c) is then added to the marble machine by adding another trough (c) after the first and exactly in line with it. The marbles rolling down the combination of the two troughs, when the first trough (a) is rocked, resonate, and, as the beam enters the other trough (c) (or output coupler section (c)), the beam imparts its resonant motion thereto (causing the output trough (c) to oscillate or rock). Thus energy fed into the first trough (a) is transferred to the output trough (c). Further, neglecting friction losses, if a dashpot or mechanical resistivity element is connected to the ouput section and correctly adjusted, all the energy fed into the first trough (a) by the rocking motion can be delivered to the mechanical resistance. The output trough (c) in this case is matched, and the oscillating beam of marbles would converge to a point at the far end of the output section. It is also apparent that, in the absence of actual contact between the two troughs, there is no connection so that only the beam carries energy from the first to the second trough. Thus the mechanical resistance receptive of the energy from the beam does not influence the input trough (a).

To amplify further the transverse oscillation imparted to the marble beam in the first trough (a), a third trough (b) is placed on a piece of foam rubber between the two troughs (a) and (c) already placed on the table. This is the pumping or amplifying trough (b) which, as will be seen, increases the amplitude of oscillation of the beam by an amount proportional to the maximum excursion of the beam as it leaves the first trough (a). To operate this amplifying trough (b), we will need a second pair of hands, and a friend is instructed to come and push the pumping section vertically up and down in phase with and at *twice* the natural transverse frequency of oscillation of the marble beam. As the marble beam traverses this combination of three troughs, we see that as long as the first trough is not rocked the beam is not affected by our friend's activity. However, when the first trough (a) is rocked to and fro so as to impart transverse oscillations to the beam, then, as the individual marbles of the oscillating beam enter the amplifying trough (b), the vertical up and down motion of this section at twice the natural frequency of the marbles causes the oscillations of the beam to be further enhanced, much like a child pumping on a swing. Thus when the beam enters the last trough (c), it will cause this section to rock to and fro by a greater amount than that of the input trough (a). The combination of the three in-line troughs described above, it should be relaized, constitutes a rather crude analogy to the real electron beam devices of the present invention. However, the use of the analogy should serve to help the uninitiated reader understand the very basic operation of the various sections of the transverse electrodynamically contained beam devices described in detail in the following sections.

Referring to the drawings wherein like numerals indicate similar parts, in FIG. 1 there is shown a charged particle beam vacuum tube such as an electron beam vacuum tube 20, provided with a charged particle beam source such as a heated filament 21, an accelerating and focusing arrangement such as a focusing electrode 22 and an anode 23 with a voltage source 24 connected to provide a relatively low unidirectional accelerating and focusing voltage $V_b$ (of the order of 50 volts) to cause the electrons to flow from the heated filament 21 through the focusing electrode 22, and a voltage source 25 connected to provide an anode voltage $V_b'$ (of the order of 10 volts) to collect the particles of the beam after it has passed through a quadrupole electrode system along the longitudinal axis 27 thereof. $V_b'$ is selected to be of a value sufficient to absorb the charged beam without secondary emission, but to have negligible effect on the velocity of the beam during its passage through the transverse containment regions. The focusing electrode 22 causes the electrons emanating from the heated filament 21 to enter the quadrupole system through a central aperture 26 which will direct electrons along the axis 27. The quadrupole system is an electrodynamic containment means comprised of a top electrode 30, a bottom electrode 31, and side electrodes 32 and 33 (partially in section to show the path of an electron beam 35 centered around the longitudinal axis of the tube). In the embodiment shown in FIG. 1, each electrode is divided into three longitudinal sections (a), (b), and (c) having effective lengths $L_1$, $L_p$, and $L_2$, respectively, by gaps 34 which may take the form of known high-pass filters (not shown) or some type of insulation inserts so that the quadrupole system itself is divided into three longitudinal sections. The first section (a) of the quadrupole system is the driving or input coupler section as defined below in connection with FIG. 2; the second section (b) of the quadrupole system is a pumping or amplifying section as defined below in connection with FIG. 15 or FIG. 17, and the third section (c) is a detection means or output coupler of the type defined below in connection with FIG. 6 which absorbs power from the modulated electron beam 35.

Referring now to FIG. 2, the path of the electron beam 35 is initiated along the axis 27 of the quadrupole system as defined by the central aperture 26 of the focusing electrode 22 (FIG. 1). As will be shown, the electron beam 35 is contained "harmonically" about the axis 27 of the quadrupole system by the action of the balanced quadrupolar electrodynamic fields formed between opposite pairs of electrode surfaces (30–31 and 32–33), by the applied containment voltages $2V_{ac} \cos \Omega t$ and $2V_{dc}$, from the voltage sources 36 and 37 respectively. The voltage $2V_{ac}$ is connected to the quadrupole system by an impedance matching means such as a resonant cavity type of device shown schematically as a transformer 38.

As will be discussed in more detail below, the "harmonic" frequencies of containment are mathematically determined by the charge to mass ratio ($e/m$) of the charged particles in the beam, the separation $2r_0$ between opposing inner surfaces of one of the pairs of diametrically positioned electrodes 30–31 or 32–33, the magnitude of the applied alternating containment voltage $V_{ac}$, the magnitude of the applied unidirectional frequency control voltage $V_{dc}$, and the containment frequency $\Omega/2\pi$. Coherent transverse signal energy is imparted to the electron beam 35 at any one of its hormonic frequencies by a resonating electrodynamic field $E_{\omega 1}$ from a signal or driving source 39, applied through a resonant means shown schematically as a transformer 40 connected between opposing driving electrodes $30_{(a)}$–$31_{(a)}$ in FIG. 2. As will be explained in further detail below, additional small unidirectional sources such as 41 are added selectively across the containment electrodes (i.e., across 30–31 and/or 32–33) for the purpose of providing a steering voltage $V_f$ for the electron beam 35 in the transverse $x$–$y$ plane.

In order that the electron beam 35 of a current $i_b$ amperes be maintained harmonically within the electrode structure, it is necessary that the containment voltages $V_{ac}$ and $V_{dc}$ and the electrodynamic containment frequency $\Omega/2\pi$ be defined in accordance with strong focusing principles, referred to herein as "alternate gradient focusing." The transverse orthogonal $x$–$y$ directions in the plane perpendicular to the axis 27 are depicted in FIG.

2. The containment electric fields are accordingly specified by the potential distribution:

$$V(x,y,t) = [\pm V_{dc} - V_{ac} \cos \Omega t]\left[\frac{x^2-y^2}{r_0^2}\right] \quad (1)$$

which satisfies the La Place equation ($\nabla^2 V(x, y, t) = 0$). These fields are seen to be balanced about the axis 27 of the quadrupole system 30–33 which is maintained near ground potential through a simple filter network including the resistors 43, the radio frequency chokes 44, and the capacitors 45.

The containment electric fields give rise to time ($t$) dependent electric forces which act for many cycles at the containment frequency $\Omega/2\pi$ upon the individual electrons as they pass through each section of the electrode structure of the quadrupole system. Calculation of the containment fields from the Equation 1 and application of Newton's law of motion show that the transverse motion of each electron is described by the following differential equations:

$$\frac{d^2x}{dt^2} + 2\left(\frac{e}{m}\right)\left[\pm\frac{V_{dc}}{r_0^2} - \frac{V_{ac}}{r_0^2} \cos \Omega t\right]x = 0 \quad (2)$$

and $$\frac{d^2y}{dt^2} + 2\left(\frac{e}{m}\right)\left[\mp\frac{V_{dc}}{r_0^2} + \frac{V_{ac}}{r_0^2} \cos \Omega t\right]y = 0 \quad (3)$$

The equations of motion along the two transverse directions are, except for changes in sign, seen to be identical. The Equation 2, describing the $x$ displacement of an electron from the axis of the device, is a function of $x$ only, while the Equation 3 is a function of $y$ displacement only. The motions along the two orthogonal directions are therefore mutually independent. Each of the Equations 2 and 3 is a special case of the Mathieu differential equation which, in its general form, is usually written:

$$\frac{d^2u}{d\xi^2} + (a_u - 2q_u \cos 2\xi)u = 0 \quad (4)$$

where $u$ may represent either $x$ or $y$ (in meters) and where the dimensionless constants $a_u$ and $q_u$ in the above equation are related to those of the present physical problem through the transformation expressions $$\xi = \Omega t/2 \text{ (normalized time)} \quad (5)$$

$$q_x = -q_y = 4\left(\frac{e}{m}\right)\left(\frac{V_{ac}}{r_0^2}\right)\left(\frac{1}{\Omega 2}\right) = |q_u| \quad (6)$$

and $$a_x = -a_y = 8\left(\frac{e}{m}\right)\left(\frac{V_{dc}}{r_0^2}\right)\left(\frac{1}{\Omega 2}\right) = |a_u| \quad (7)$$

Thus $a_u$ is a function of the unidirectional frequency control voltage $V_{dc}$ and $q_u$ is a function of the alternating containment quadrupole voltage $V_{ac}$. Theory shows that the Mathieu equation can have either stable or unstable solutions depending upon the numerical values of $a_u$ and $q_u$ (see N. W. McLachlan, Theory and Applications of Mathieu Functions, Oxford Press, New York, 1947). For $a_u$ and $q_u$ values within the first region of stability, the solution of Equation 4 is in the form:

$$u(\xi) = A \sum_{n=-\infty}^{n=+\infty} C_{2n} \cos (2n+\beta)\xi$$

$$+ B \sum_{n=-\infty}^{n=+\infty} C_{2n} \sin (2n+\beta)\xi \quad (8)$$

where $n$ is an integer and the coefficients A and B are constants of integration whose values are determined by the initial conditions, namely, $u(0)$ and $du(0)/d\xi$, and the $C_{2n}$ coefficients in the above expression are functions of the $a_u$ and $q_u$ parametric values. For values of $a_u \approx 0$ and $q_u < \frac{3}{4}$ (which define the preferred region of operation for the present invention) these coefficients can be shown to be given by the following equation:

$$\frac{C_{2n}}{C_0} \approx \frac{q_u^n}{\frac{n}{\pi}(2n+\beta)^2} \quad (9)$$

where $n \neq 0$, for example:

$C_{-2}/C_0 \approx q/(-2+\beta)^2$, $C_{-4}/C_0 \approx q_u^2/(-2+\beta)^2(-4+\beta)^2$ etc.

According to the Equations 8 and 9, the stable motion consists of an an oscillation at the normalized angular subfrequency $\beta$ ($0 < \beta < 1$) upon which are superimposed other progressively smaller harmonic vibrations at normalized frequencies of $2-\beta$, $2+\beta$, $4-\beta$, etc. The fundamental or resultant frequency of motion $\beta$ is also a function of the $a_u$ and $q_u$ parametric values. For small values of $q_u$ this functional relationship is approximately:

$$\beta \approx \sqrt{a_u + \frac{q_u^2}{2}} \quad (10)$$

where $q_u < \frac{1}{2}$.

For the two dimensional transverse containment means requisite to the present invention, the question of the $a_x$, $a_y$, $q_x$, and $q_y$ values giving simultaneous stable containment along the two independent $x$ and $y$ directions is most simply presented by a single Cartsian graph plotted in terms of the $a_x$ and $q_x$ values. For this representation the $a_y$ and $q_y$ parametric values are expressed in terms of the $a_x$ and $q_x$ values through the negative one-to-one relationship between these parameters as shown in the Equations 6 and 7.

FIG. 3, wherein the scale of the ordinates is in terms of $a_x$ and the scale of the abscissae is in terms of $q_x$, shows the resulting stability plot for the quadrupolar containment fields of the Equation 1. The stable $a_x$, $a_y$, $q_x$, and $q_y$ values are contained within the solid boundary curves which correspond, as indicated, to the limiting values of the resultant frequency of motion, respectively $\beta_x=0$, $\beta_x=1$, $\beta_y=0$, and $\beta_y=1$. Numerical values for the stability limits are given in published tables (see: Computation Laboratory, U.S. Bureau of Standards, Tables Relating to Mathieu Functions, Columbia University Press, New York, 1951). Some of the other iso-$\beta$ curves within the common first region of stability are shown as dashed curves in FIG. 3. These curves correspond to the loci of $a_u$ and $q_u$ values which give the same normalized resultant frequency of motion. The iso-$\beta_x$ or $\beta_y=0$ curves have the physical significance that the binding due to the time varying part of the Equation 4 is exactly cancelled by the defocusing action of the static $a_u$ term.

For constant magnitude $V_{ac}$ and $V_{dc}$ values, the operation of the containment fields is specified in the stability diagram of FIG. 3 along a straight line intercepting the origin and having a slope $$a_x/q_x = \pm 2V_{dc}/V_{ac} \quad (11)$$

That is to say, for given applied containment voltages $V_{ac}$ and $V_{dc}$ this operational line D (FIG. 3) determines the range of containment frequency $\Omega/2\pi$ through which the charged particles of the electron beam 35 will be stably bound to the axis 27 of the quadrupole system.

The selection of proper values of $V_{ac}$, $V_{dc}$, and $\Omega$ so that the normalized $a_u$ and $q_u$ values are within the stability region of FIG. 3 further means that each excited electron of the longitudinal electron beam 35 will (when excited) execute in the transverse plane stable oscillatory vertical and/or horizontal motions of the form of the Equation 8. The motions along the independent $x$ and $y$ directions will not necessarily be the same due to the negative one-to-one relationship between the $a_x$ and $a_y$ coefficients. The resultant oscillating $\beta$ frequencies ($\omega_x = \beta_x \Omega/2$ and $\omega_y = \beta_y \Omega/2$) will, according to the Equation 10, be in the ratio of:

$$\frac{\omega_x}{\omega_y} = \frac{\beta_x}{\beta_y} = \sqrt{\frac{a_x + q_x^2/2}{a_y + q_y^2/2}} \quad (12)$$

where $q_x$ and $q_y \leq \frac{1}{2}$.

The above equation can be rewritten solely as a function of $a_x$ and $q_x$ through the Equations 6 and 7, namely, $$\frac{\omega_x}{\omega_y} = \frac{\beta_x}{\beta_y} = \sqrt{\frac{a_x + q_x^2/2}{-a_x + q_x^2/2}} \quad (13)$$

when $a_x = 0$ (i.e., $V_{dc} = 0$), the two resultant angular frequencies $\omega_x$ and $\omega_y$ are in a one-to-one ratio and the motion, except for a phase factor, will be the same in either the $x$ or $y$ directions, depending upon which electrodes are so energized. For this case the excited motion of a single electron in the transverse plane will have the form of a one-to-one Lissajou pattern upon which is superimposed a ripple motion due to the higher frequency terms in the solution of the Equation 8. FIG. 4, wherein the scale of the ordinates is in terms of the dominant transverse oscillating frequencies ($\omega_u/2\pi$) of the electron beam 35, and the scale of the abscissae is in terms of the containment voltage $V_{ac}$, with $V_{dc}$ used as a parameter, shows the relation between $\omega_u$, $V_{dc}$, and $V_{ac}$ for two different values of the applied containment frequency $\Omega/2\pi$ and electrode separation $r_0$. Specifically the representative values of $\Omega/2\pi$ and $r_0$ are 1000 megacycles and ⅛ inch, or 2000 megacycles and ⅟₁₆ inch respectively. FIG. 4 is presented to illustrate clearly the true functional dependance of the dominant oscillating angular frequencies $\omega_{\beta u}$ (the resultant frequency), $\Omega - \omega_{\beta u}$ (the lower sideband frequency), and $\Omega + \omega_{\beta u}$ (the upper sideband frequency) on the applied quadrupolar voltage $V_{ac}$, when $V_{dc}$ equals either 0 or ±10 volts. As is apparent from the above discussion of FIG. 2, when $V_{dc}$ is positive for $x$ motion, it is similarly negative for $y$ motion, so that, as shown in FIG. 4, when the $\omega_{\beta x}$ is increased by the application of $V_{dc}$, $\omega_{\beta y}$ is decreased. The empirical data supporting FIG. 4 presumes a longitudinal current beam which is composed of electrons ($e/m = 1.76 \times 10^{11}$ coulombs/kilogram). The curve of FIG. 4 further demonstrates the failure of the Equation 10 past values of $2\omega_\beta/\Omega = \beta > 0.35$.

The addition of the unidirectional quadrupole frequency control source 37 in series with the alternating quadrupole containment source 36 acts to strengthen the effective binding and thus increase the frequency of oscillation of the beam along one of the independent directions at the expense of the other direction. For example, as shown in FIG. 2 and illustrated in FIG. 4, application of $V_{dc}$ so that it is focusing in the $x$ (defocusing in the $y$) direction means that according to the Equation 13 the resultant frequency will be greater along the $x$ direction and less along the $y$ direction. The proper addition of $V_{dc}$ can result in a condition in which the resultant angular frequencies $\omega_x$ and $\omega_y$ are in a two-to-one ratio (for instance at either $a_x = 0.05$ and $q_x = 0.43$ or $a_x = 0.135$ and $q_x = 0.735$ in FIG. 3). In this case the transverse trajectory will have the overt appearance of a two-to-one Lissajou pattern. For small values of $q_u$, the Equation 1 shows that this condition of $\omega_x/\omega_y = 2$ occurs along the parabola $a_x = 3q_x^2/10$.

Moreover, it becomes apparent from the above discussion that the angular frequencies $\omega_x$ and $\omega_y$ may be varied by varying $V_{dc}$. The frequencies may therefore be swept over a range of frequencies by varying $V_{dc}$. One method of such variation would be to replace the unidirectional source 37 with a sawtooth generator.

This discussion further points out a significant difference between alternate gradient focusing quadrupolar electric field containment and magnetic field containment, namely, that not only can the frequencies of vibration along the two directions be made different, but they can also be controlled (or tuned) through the unidirectional quadrupolar source 37 (FIG. 2). By themselves, the confining fields do nothing more than provide the means by which power can be carried by the beam. Put more simply, the confining quadrupolar fields serve to produce an effective "spring constant" which then can be used as the basic element in a suitable electronic device such as a coupler, an amplifier, an oscillator, etc.

The previous discussion has therefore outlined the strong focusing theory which is basic and implicit in the operation of the present invention. Further electrical confinement theory is explained in detail in the copending application for Letters Patent, Serial No. 836,486, entitled Containment Device, filed August 27, 1959, by D. B. Langmuir, R. V. Langmuir, H. Shelton, and R. F Wuerker, now Patent Number 3,065,640, which issued November 27, 1962, and is assigned to the assignee of the present application.

The following discussion will show how high frequency signal energy is coupled to the electron beam 35 at a transverse vibrational frequency $\omega_1$, how it is amplified, and how it is abstracted as useful output power.

*The Input Coupler Section (a)*

The input coupler section (FIG. 2) serves as the means by which transverse energy is imparted coherently at resonance to the confined longitudinal electron beam 35. As shown, the input coupler section (a) superimposes about the axis 27 of the quadrupole electrode system an alternating electric field $E_1$ of angular frequency $\omega_1$. Thus, as the beam passes through the input coupler section (a) of FIG. 1, the motion of each electron in the $x$ direction is specified by the differential equations:

$$\frac{d^2x}{dt^2} + 2\left(\frac{e}{m}\right)\left[\pm\frac{V_{dc}}{r_0^2} - \frac{V_{ac}}{r_0^2}\cos\Omega t\right]x$$
$$= \left(\frac{e}{m}\right)(E_{1x})\sin(\omega_{1x}t + \phi_x) \quad (14)$$

and if the $y$ direction is similarly excited either separately or simultaneously:

$$\frac{d^2y}{dt^2} + 2\left(\frac{e}{m}\right)\left[\mp\frac{V_{dc}}{r_0^2} + \frac{V_{ac}}{r_0^2}\cos\Omega t\right]y$$
$$= \left(\frac{e}{m}\right)(E_{1y})\sin(\omega_{1y}t + \phi_y) \quad (15)$$

where $E_{1x}$ and $E_{1y}$ are the components of the transverse resonating field along the independent $x$ and $y$ directions of motion, and $\phi$ is a phase angle.

The left-hand side of each of these differential equations of forced motion accounts for the alternating and static containment quadrupolar electric fields which (as discussed above) give to the particles of the electron beam 35 the ability to vibrate (or oscillate transversely) simultaneously in either $x$ or $y$ directions at discrete harmonic frequencies, such as $\omega_{\beta x}$ (the resultant frequency of motion in the $x$ direction), $\Omega - \omega_{\beta x}$, $\Omega + \omega_{\beta x}$, $2\Omega + \omega_{\beta x}$, ..., and $\omega_{\beta y}$, $\Omega + \omega_{\beta y}$, ..., etc., respectively. As might be expected, the electron beam 35 can be brought into resonance with the transverse field $E_1$ whenever the frequency of the latter equals any one of the above-mentioned possible vibratory frequencies of the electron beam 35. That is to say, the transverse resonance condition in the input coupler section occurs whenever:

$$\mp\omega_{1u} = \mp n\Omega + \omega_{\beta u} \quad (16)$$

When the above resonance condition is fulfilled, the trajectory U of the electron beam 35 will increase linearly with time ($t$) according to the expression:

$$U(t) \simeq \left(\frac{eE_u}{2m}\right)\left(\frac{t}{\omega_{\beta u}}\right)\left(\frac{C_{2n}}{C_0}\right)\sum_{n=-\infty}^{\infty}\frac{C_{2n}}{C_0}\cos[(n\Omega + \omega_{\beta u})t + \phi] \quad (17)$$

where the $C_{2n}$'s are the Mathieu coefficients of the Equations 8 and 9.

The Equation 17 shows that at resonance all of the frequency components of the stable solution of the Equation 8 grow linearly with time. Further, the gain per cycle of the resultant frequency of motion $\omega_{\beta_u}$ is greatest when the frequency of the transverse field equals the resultant or $\beta$ frequency of the charged particle. Thus, for the case of $\omega_1 = \omega_{\beta_u}$, the resonance equation reduces to:

$$U(t) = \left(\frac{eE_u}{2m}\right)\left(\frac{t}{\omega_{\beta_u}}\right)\sum_{n=-\infty}^{\infty}\frac{C_{2n}}{C_0}\cos[(n\Omega+\omega_{\beta_u})t+\phi]$$
$$\omega_1 = \omega_{\beta_u} \qquad (18)$$

Since the coupling to the electron beam 35 is greatest at this frequency of operation, such operation will be considered the normal or preferred mode. This does not preclude acceptance of the energy by the electron beam 35 at one of the other higher vibratory frequencies. Moreover, as will be more clearly explained below, the Equation 17 shows that it is feasible to operate the device as either an up or down converter of the input signal frequency $\omega_1$.

When the transverse electric field fulfills the resonance condition of the Equation 16 along either the $x$ or $y$ directions of possible motion, it is apparent from the Equation 18 that each electron of the beam vibrates with increasing displacement as it moves through the input coupler section ($a$). For example, for the case of resonance along the $x$ direction as a result of the excitation shown in FIG. 2, and at any instant of time, all of the electrons of the beam will have the same phase with respect to the transverse electric field $E_1$. As a function of both time and longitudinal distance $z$ into the transverse interaction space, the beam profile becomes, according to the Equation 17:

$$X(z,t)$$
$$= \left(\frac{eE_{1x}}{2m}\right)\left(\frac{z}{v_z}\right)\left(\frac{C_{2n}}{C_0}\right)\left(\frac{1}{\omega_{\beta_x}}\right)\sum_{n=-\infty}^{\infty}\frac{C_{2n}}{C_0}\cos[(n\Omega+\omega_{\beta_x})t+\phi_x]$$
$$(19)$$

where $v_z$ is the longitudinal velocity of the beam.

To first order, the extremes of the oscillation of the beam form the equal sides of an isosceles triangle having a base dimension of $$\left(\frac{eE_{1x}}{m}\right)\left(\frac{L_1}{v_z}\right)\left(\frac{1}{\omega_{\beta_x}}\right)\left(\frac{C_{2n}}{C_0}\right)$$

where $L_1$ is the height of the triangle drawn along the axis 27 as well as the effective length of the transverse input coupler section ($a$).

Thus the resonant electron beam 35, if it could be seen in the input coupler section ($a$), would look like a rigid pendulum (FIG. 1) which is vibrating transversely as a Mathieu oscillator, and along which the individual electrons are progressing longitudinally. A first pivot point $pp_1$ of the electron beam 35 is located at the beginning of the transverse interaction region (i.e., at $z=0$ in the Equation 19).

Figure 5:
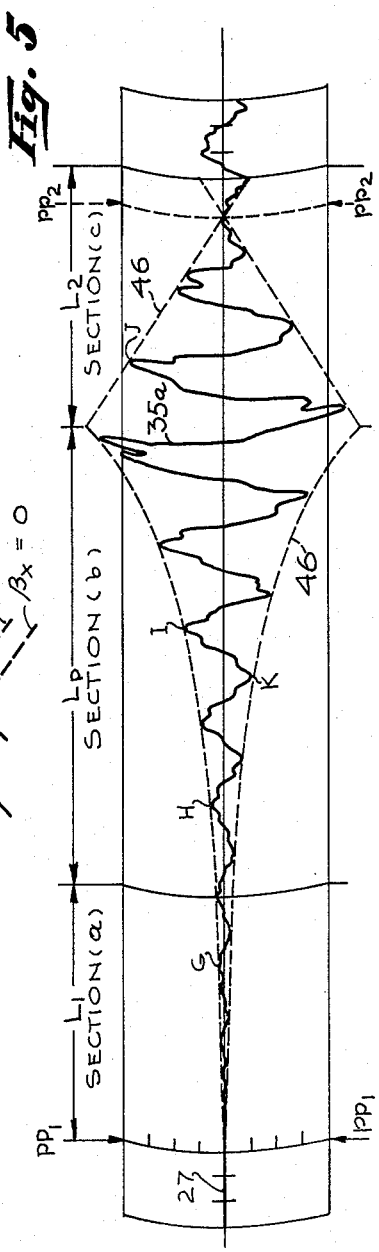
FIG. 5 is a curve of the path of an electron through the quadrupole system of FIG. 1 and shows a representative envelope boundary of the electron beam of the present invention.

As an electron progresses along the beam 35, it will execute, according to Equation 18, a complex trajectory. FIG. 5 shows such a trajectory or path 35a of a representative electron moving along the quadrupole electrode system under the influence of the traverse oscillating electric fields being considered. In this figure, the normalized $q_u$ parameter has a value of ½. Section ($a$) of FIG. 5 illustrates on a reduced scale both the path 35a of a single electron and the maximum extremes of oscillation of the beam as a beam envelope boundary 46 which pivots about the pivot point $pp_1$ at the beginning of the input coupler section ($a$) of length $L_1$. It is apparent in FIG. 5 that the electron path 35a is a function of more than a single transverse oscillatory frequency. This phenomenon has been explained above and also illustrated in FIG. 4.

FIG. 5 is more complete in that it shows a beam envelope boundary 46 and electron path 35a for a typical quadrupole system wherein each of the sections ($a$), ($b$), and ($c$) is energized. As indicated in FIG. 1, the contained electron beam 35 maintains phase coherence with respect to the transverse resonating field $E_1$, so that at all times, during various oscillatory cycles, when a portion of the electron path 35a approaches the beam envelope boundary 46 (i.e., points G, H, I, J, K, etc.), all electrons of the electron beam 35 lie along the envelope boundary 46. Also an individual electron progresses along the path 35a and along the electron beam 35 as a function of the accelerating voltage $V_b$. As will be explained in further detail below, the initial transverse oscillations imparted to the electron beam 35 in the input coupler section ($a$) are amplified in the amplifying section ($b$) and detected in the output coupler section ($c$) where the transverse vibrational amplitude decreases as energy transfers from the beam to an external load device.

*Power Absorption in the Input Coupler Section ($a$)*

One can calculate both the transverse signal power $P_{(a)}$ which is imparted to the electron beam 35 and the electronic resistance $R_{(a)}$ which this absorption of energy presents to the terminals of the input coupler section ($a$). The power $P_{(a)}$ delivered to the electron beam 35 when it is in resonance with the transverse driving field $E_{1x}$ in the input coupler section ($a$) (in, for example, the $x$ direction), can be expressed as:

$$P_{(a)} = \frac{1}{2}\left(\frac{m}{e}\right)\left(\frac{dx}{dt}\right)^2_{\max.} i_b \text{ watts} \qquad (20)$$

where $$\frac{1}{2}m\left(\frac{dx}{dt}\right)^2_{\max.}$$

is the energy stored in one electron as it passes through the input coupler section ($a$) and $i_b/e$ is the number of electrons per second flowing along the beam.

The maximum transverse velocity is calculated by differentiating the Equation 17, namely:

$$\left(\frac{dx}{dt}\right)_{\max.} \simeq \frac{eE_{1x}}{2m}\left(\frac{L_1}{v_z}\right)\left(\frac{C_{2n}}{C_0}\right)\sum_{n=-\infty}^{\infty}\frac{C_{2n}}{C_0}\left(\frac{n\Omega+\omega_{\beta_x}}{\omega_{\beta_x}}\right) \qquad (21)$$

or in terms of the maximum displacement $$\left(\frac{dx}{dt}\right)_{\max.} \simeq (\omega_{\beta_x})(x_{\max.})\frac{\sum_{n=-\infty}^{\infty}\frac{C_{2n}}{C_0}\frac{n\Omega+\omega_{\beta_x}}{\omega_{\beta_x}}}{\sum_{n=-\infty}^{\infty}\frac{C_{2n}}{C_0}} \qquad (22)$$

Substituting either the Equation 21 or the Equation 22 into the Equation 20 one gets the power $P_{(a)}$ imparted to the beam within the input coupler section ($a$):

$$P_{(a)} \simeq i_b \left(\frac{E_{1x}^2}{8}\right)\left(\frac{e}{m}\right)\left(\frac{L_1}{v_z}\right)^2\left(\frac{C_{2n}}{C_0}\right)\frac{C_{2n}}{C_0}\left[\sum\frac{(n\Omega+\omega_{\beta_x})}{\omega_{\beta_x}}\right]^2 \qquad (23)$$

and/or $$P_{(a)} \simeq \frac{i_b}{2}\left(\frac{m}{e}\right)\omega_{\beta_x}^2 x_{\max.}^2 \left[\frac{\sum\frac{C_{2n}}{C_0}\frac{n\Omega+\omega_{\beta_x}}{\omega_{\beta_x}}}{\sum\frac{C_{2n}}{C_0}}\right]^2 \qquad (24)$$

One should realize that the Equations 20–24 will also define the output power $P_{(c)}$ discussed below as derivable in the output coupler section ($c$) having a length $L_3$.

Moreover, one can equivalently write the input coupler absorption power $P_{(a)}$ in terms of an equivalent or effective potential $V_{\text{eff}}$ through which the electron beam 35 is carried by the resonating transverse electric field, namely, $$P_{(a)} = i_b V_{\text{eff}} \qquad (25)$$

Equating the Equation 24 to the Equation 25 one derives an expression for the effective potential $V_{\text{eff}}$ as a function of the transverse oscillatory displacement of the electron beam 35 from the axis 27 of the quadrupole system.

Further, through the transformation equations which specify the normalized Mathieu parameters $q_u$, $a_u$, and $\beta_u$ in terms of the operating parameters of the containment electric fields as defined in the Equations 5, 6, and 7, one can derive an expression for the effective potential in terms of the alternating containment voltage $V_{ac}$, namely:

$$V_{eff} \simeq \frac{V_{ac}\beta_x^2}{2q_x}\left(\frac{x_{max.}}{r_0}\right)^2 \left[\frac{\sum \frac{C_{2n}}{C_0}\frac{n\Omega+\omega_{\beta_x}}{\omega_{\beta_x}}}{\sum \frac{C_{2n}}{C_0}}\right]^2 \quad (26)$$

For small values of $q_x$ ($<\frac{1}{2}$) the maximum effective potential between the axis 27 of the quadrupole system and the inner electrode surfaces is approximately one-tenth the containment voltage $V_{ac}$ (assuming that $V_{dc}$ is fixed at zero).

For values of the parameter $q_u$ less than about one-half, the above expressions for the power absorbed can be simplified by equating the summations involving the $C_{2n}$ coefficients to unity; that is to say, within this range of linear dependence of $\beta$ on $q_u$ according to the Equation 10, the above expressions for the absorbed power $P_{(a)}$ and the effective potential can be written:

$$P_{(a)} \simeq i_b \left(\frac{E_{1x}^2}{8}\right)\left(\frac{e}{m}\right)\left(\frac{L_1}{v_z}\right)^2\left(\frac{C_{2n}}{C_0}\right)^2 \text{watts} \quad (27)$$

or $$P_{(a)} \simeq \frac{1}{2}\left(\frac{m}{e}\right)\omega_{\beta_x}^2 x_{max.} i_b \text{ watts} \quad (28)$$

and $$V_{eff} \simeq \frac{V_{ac}\beta_x^2}{2q_x}\left(\frac{x_{max.}}{r_0}\right)^2 \text{ volts} \quad (29)$$

For example, when $\omega_{\beta_x}/2\pi = 200$ megacycles, $X_{max.} = \frac{1}{8}$ inch, and $i_b = 1$ milliampere, the electron beam 35 absorbs 45 milliwatts of power continuously during its traversal of the input coupler section $(a)$. For this case the effective potential at $X_{max.} = \frac{1}{8}$ inch would be 45 volts with respect to the axis 27 of the quadrupole system.

*Input Coupler Loading and Transverse Beam Resistance $R_{(a)}$*

The power equations derived in the above discussion enable one to calculate the electronic resistance $R_{(a)}$ which the absorption of energy presents to the input coupler terminals. In this case the resistance $R_{(a)}$ is calculated by equating the power delivered to the beam to the power lost in $R_{(a)}$, namely:

$$P_{(a)} = \frac{V_1^2}{2R_{(a)}} \quad (30)$$

where $V_1$ is the peak signal voltage (FIG. 2) applied across the input coupler section $(a)$.

The resistance $R_{(a)}$ can further be expressed in terms of the operating parameters by equating the above Equation 30 to the Equation 23 and solving for $R_{(a)}$. In this case one writes the beam velocity $v_z$ in terms of the accelerating voltage $V_b$, and the transverse field $E_{1x}$ in terms of the applied signal voltage $V_{1x}$, specifically:

$$v_z = \sqrt{\frac{2e}{m}V_b} \quad (31)$$

and $$E_{1x} = \gamma\frac{V_{1x}}{r_0} \quad (32)$$

where $\gamma$ is a geometrical coupling coefficient factor (to be discussed in more detail below).

When the above-mentioned steps are completed, one finds for the transverse resistance $R_{(a)}$ presented across the input coupler section $(a)$:

$$R_{(a)} \simeq \frac{8Z_b\left(\frac{r_0}{\gamma L_1}\right)^2}{\left(\frac{C_{2n}}{C_0}\right)^2\left[\sum_{n=-\infty}^{\infty}\frac{C_{2n}}{C_0}\frac{n\Omega+\omega_{\beta_x}}{\omega_{\beta_x}}\right]^2} \text{ ohms} \quad (33)$$

where $Z_b$ is the longitudinal beam impedance, namely:

$$Z_b = V_b/i_b \text{ ohms} \quad (34)$$

For values of $q_x < \frac{1}{2}$ (i.e., $2\omega_{\beta_x}/\Omega < 0.4$), the above expression can be simplified to:

$$R_{(a)} = \frac{8Z_b\left(\frac{r_0}{\gamma L_1}\right)^2}{\left(\frac{C_{2n}}{C_0}\right)^2} \text{ohms} \quad (35)$$

illustrating, according to Equation 9 that the transverse loading at the input coupler section $(a)$ is the greatest when the frequency $\omega_{1x}$ of the driving field $E_{1x}$ is equal to the resultant frequency $\omega_{\beta_x}$ of particle motion. For this case $C_{2n}/C_0 = 1$.

$$R_{(a)} = 8Z_b\left(\frac{r_0}{\gamma L_1}\right)^2 \text{ ohms} \quad (36)$$

For example, when $i_b = 1$ milliampere, $V_b = 50$ volts, $r_0 = \frac{1}{8}$ inch, $L_1 = 1$ inch, and $\gamma = 0.23$; then $R_{(a)} = 15,000$ ohms when $\omega_{1x} = \omega_{\beta_x}$.

*The Output Coupler Section $(c)$*

Figure 6:
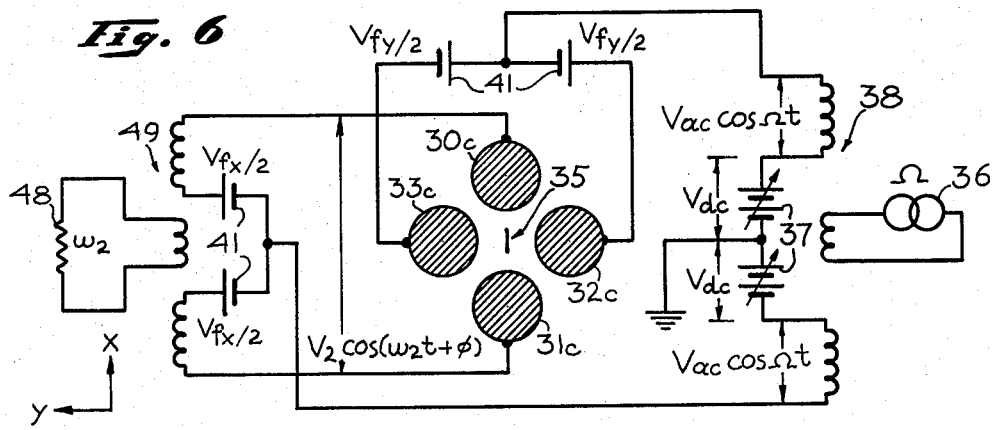
FIG. 6 is a cross-sectional view of the output coupling section taken along line 6—6 of FIG. 1 showing in a simplified form the necessary external electric circuit connections.

The above discussion has demonstrated how transverse energy is coupled to the electron beam 35 and how the effect manifests itself as an effective load on the signal producing external excitation circuit. Such a coupling section can also be used to absorb energy from the electron beam 35 if the transverse output signal electric field is 180° out of phase with the oscillatory motion of the electron beam 35. Such is the case in the output coupler section $(c)$ which, as shown in FIG. 6 in cross-section, is usually geometrically the same as the input coupler section $(a)$ shown in FIG. 2. In the output coupler section, a shunt load 48 is connected across the opposing pair of transverse field electrodes ($30_{(c)}$–$31_{(c)}$) by an impedance matching means such as a tuned circuit or resonant cavity, shown schematically as a transformer 49. It should be noted that the output electrodes lie in the same plane as the ones excited by $\omega_1$. The decelerating transverse field $E_2$ results from currents induced in the external load by the oscillating electron beam 35. Accordingly the transverse motion dies away as the stored power is absorbed by the external shunt load 48.

If one assumes that there is no excitation in the amplifying section $(b)$, that the electrode surfaces of the output coupler section $(c)$ are identical geometrically to those of the input coupler section $(a)$, that the longitudinal beam velocity $v_z$ is substantially the same in both sections, and that proper impedance matching is provided, all the stored vibratory energy in the electron beam 35 will be absorbed in the output shunt load 48. Impedance matching is obtained when the equivalent external shunt resistance $R_s$ equals the transverse beam resistance $R_{(c)}$ in the output coupler section $(c)$ as shown in the Equation 33 (with the above assumption $R_{(a)} = R_{(c)}$), namely:

$$R_s = R_{(c)} = \frac{8Z_b(r_0/\gamma L_2)^2}{\left(\frac{C_{2n}}{C_0}\right)^2\left[\sum_{n=-\infty}^{\infty}\left(\frac{C_{2n}}{C_0}\right)\left(\frac{n\Omega+\omega_{\beta_x}}{\omega_{\beta_x}}\right)\right]^2} \quad (37)$$

This corresponds to a matched condition in which the triangular profile of the beam envelope boundary 46 (FIG. 5) in the output coupler section $(c)$ is a mirror image of that in the input coupler section $(a)$.

Referring again to FIG. 5, too large an external shunt resistance $R_s$ across the output electrode section $(c)$ will result in too great a rate of extraction of energy from the electron beam 35 within the output coupler section (c). The pivot point $pp_2$ the beam in this case would lie within the region of the induced transverse field so that the electrons of the beam will fall in phase with the field and thereby carry energy away from the output signal circuit. FIG. 5 in section (c) shows in dashed lines the envelope boundary 46 of an electron beam 35 which is delivering power to an under-matched load connected to the output terminals. Too small a shunt load resistance $R_s$ reflected across the output terminal, on the other hand, will not be able to extract all of the transverse vibratory energy from the electron beam 35. In this case the pivot point $pp_2$ of the beam is not reached within the length $L_2$ of the output coupler section (c). By proper impedance matching all of the initial transverse energy carried by the electron beam 35 may be absorbed and delivered to the output shunt load 48. As shown in FIG. 1, for this case the pivot point $pp_2$ lies at the exit plane of the transverse interaction region of the output coupler section (c).

The above discussion naturally assumes that the containment quadrupolar fields extend throughout the region of the output coupler section (c) and that they are the same as those in the input coupler section (a), as specified by the Equation 1.

In most cases the tuned circuit or resonant cavity 49 which is connected across the electrodes of the output coupler section (c) (for matching to the external shunt load 48) is tuned to the resultant or $\beta$ frequency of oscillation of the electron beam 35, namely, $\omega_2 = \omega_\beta$ (FIG. 6). However, according to the earlier discussion of the operation of the input coupler section (a), one can also extract power at other frequencies by tuning the output circuit to any one of the other higher frequencies at which the electron beam 35 is simultaneously vibrating. That is to say, the tuned frequency $\omega_2$ of the output circuit may be similar to the Equation 16:

$$\mp \omega_2 = \mp n\Omega + \omega_\beta \qquad (38)$$

When $n \neq 0$ in the above equation, the coupling is not as effective since the beam impedance is increased, as explained in connection with the Equations 33 and 9. For more effective extraction of power $P_{(c)}$ at one of the higher frequencies, one can accordingly profit by either increasing the length $L_2$ of the output coupler section (c), decelerating the longitudinal velocity $v_z$ of the beam, or both, to increase the transverse beam resistance $R_{(c)}$. If proper impedance matching is obtained, the Equation 23 indicates the advantages of such changes.

*Further Comments on the Input and Output Coupler Sections (a) and (c) (the y motion and the coupling coefficient $\gamma$)*

The above discussions of the operation of the couplers have dealt almost exclusively in the Equations 19–37 with a condition in which the electron beam 35 was excited transversely along the $x$ direction of motion by transverse resonating fields ($E_{1x}$). This approach was taken for purposes of simplifying the illustration and maintaining continuity. It should be realized that the results can be applied equally as well to the $y$ independent direction of motion. That is to say, one can substitute $y$ indicating subscripts in the Equations 19–37 for all of the $x$ subscripts shown. It must be remembered (as pointed out earlier) that the transverse oscillating frequencies of the beam along the two independent directions of motion are not necessarily the same, depending upon the value of the frequency control voltage $V_{dc}$, as pointed out in the Equations 6, 7, 12, and 13 and shown in FIG. 4.

Further, in relating the transverse exciting fields $E_{1x}$ (or $E_{1y}$) in the input coupler section (a) to the applied peak signal voltage $V_1$ (developed across the transverse field electrodes), and the transverse electrode separation $2r_0$, a geometrical factor $\gamma$ was introduced for the first time in the Equation 32. A better comprehension of the values of the coupling coefficient $\gamma$ will be obtained from the following discussion. For instance, if the transverse field $E_1$ were created by parallel plate condenser construction having separation $2r_0$, then the coupling coefficient $\gamma$ in this idealized case would have a value of 0.5. For a more realistic physical construction of the input coupler section (a) of the type shown in FIG. 2, or equivalently the output coupler section (c) of FIG. 6 in which the transverse field is developed across two of the opposing electrodes which also generate the containment fields of the Equation 1, calculation by the method of images (when the radius of the electrodes equals the characteristic separation $r_0$) shows that near the axis $\gamma \approx 0.44$. The calculation assumes that at the center of the quadrupole system, the other orthogonal set of electrodes has little influence on the transverse field. In actual practice, the other nearby electrodes will in fact reduce the value of $\gamma$ slightly. The input coupler section (a) and the output coupler section (c) shown in FIG. 1 may each be energized by separate resonant cavities (as indicated at 38 and 40 in FIG. 2) for applying separately the quadrupolar containment fields and the transverse dipole signal fields. Further, electrical isolation between the input coupler section (a) and output coupler section (c) at the signal frequencies can only be achieved by some type of gapping between sections (a) and (c) with the attendant undesired perturbations on the quadrupolar containment fields.

Figure 7:
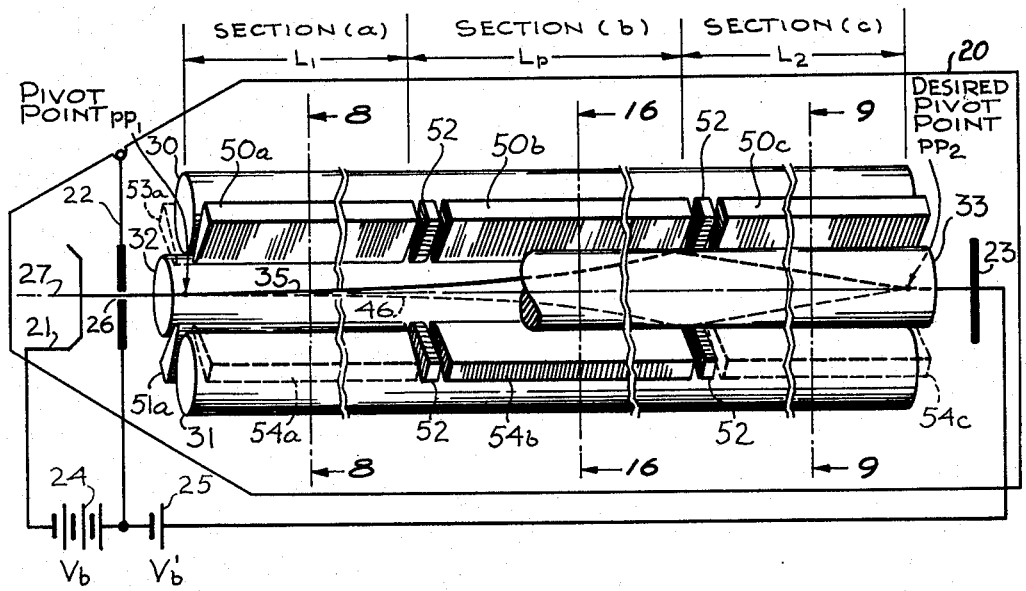
FIG. 7 is a schematic side view, partially broken away, of another embodiment of the present invention.
Figure 8:
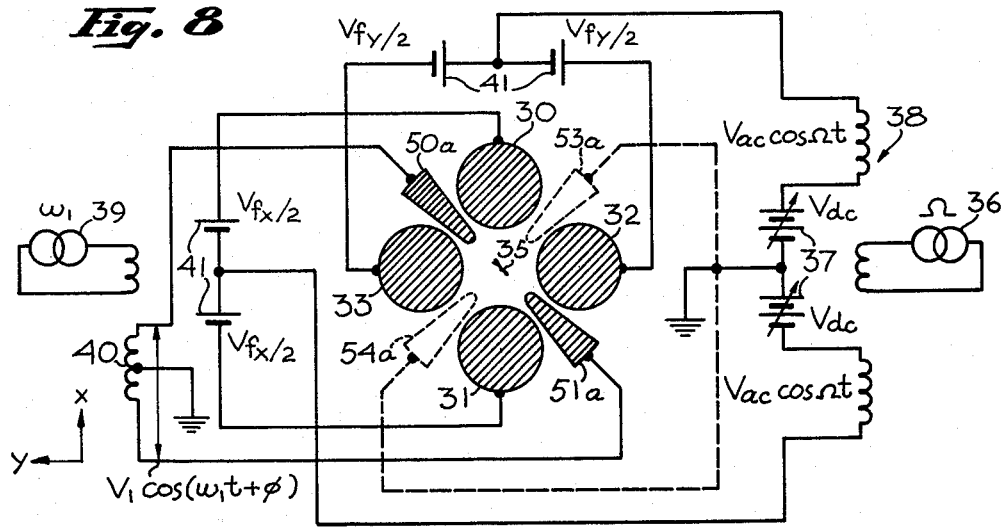
FIG. 8 is a cross-sectional view of a driving or input coupling section taken along line 8—8 of FIG. 7 showing necessary electric circuit connections.
Figure 9:
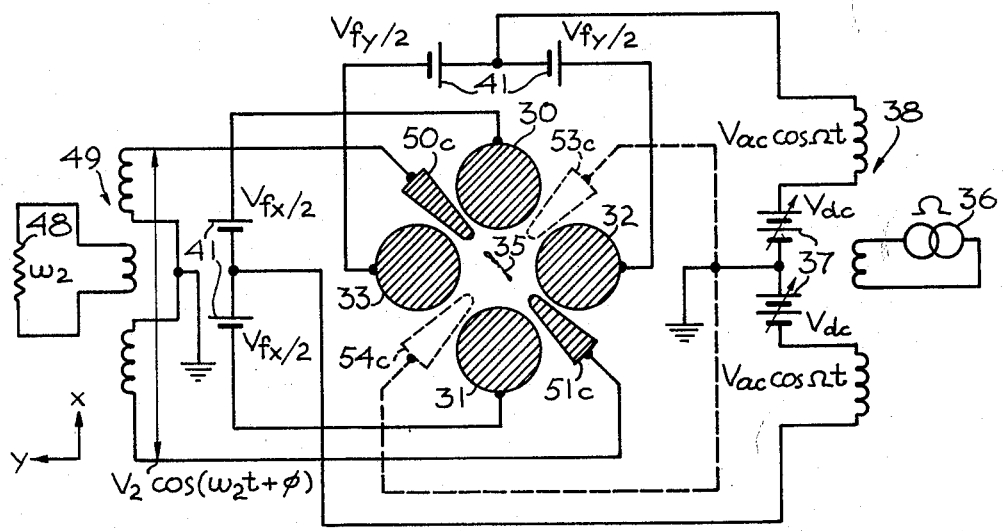
FIG. 9 is a cross-sectional view of an output coupling section taken along the line 9—9 of FIG. 7.

An octupolar electrode arrangement including input and output coupler sections is shown in FIGS. 7, 8, and 9. Such an octupolar or oriented system overcomes these isolation problems by introducing in its simplest form pairs of coplanar transverse signal or driving field electrodes $50_{(a)} - 51_{(a)}$ and signal or detection electrodes $50_{(c)} - 51_{(c)}$ along the zero potential regimes of the containment field quadrupole electrodes 30–31 and 32–33. Thus electrostatic balance of the containment means is enhanced. The complete geometrical isolation between the input and output signal circuits and the confinement circuit is achieved at the price of a reduced value of the coupling coefficient factor $\gamma$. In the input coupler section (a) of the type shown in FIGS. 7 and 8 (or equivalently the output coupler section (c) shown in FIGS. 7 and 9), the transverse field is oriented at 45° with respect to the independent $x$ and $y$ directions of particle containment. Calculation by the technique of conformal mapping shows that for this type of oriented system when $\omega_{\beta x} = \omega_{\beta y}$ (i.e., $V_{dc} = 0$), the electron beam 35 vibrates in the plane of the coupling field and $$\gamma \approx 1/\pi \approx 0.32 \qquad (39a)$$

The calculation of Equation 39a assumes that the opposing electrodes $50_{(a)} - 51_{(a)}$ or $50_{(c)} - 51_{(c)}$ are separated by a radial distance of $2r_0$ and that the other electrodes (30–33) have little influence on the transverse driving fields near the axis 27. In actual practice $\gamma$ is slightly smaller than 0.32 because of the failure of this assumption.

When the frequency control voltage $V_{dc}$ is not zero, the frequencies along either the $x$ or $y$ directions are different and the beam will vibrate only in the direction whose frequency fulfills the resonance condition. In this case $$\gamma \approx \cos 45°/\pi \approx 0.23 \qquad (39b)$$

The power $P_{(a)}$ absorbed in the input coupler section (a) is now one-fourth as great as when both the $x$ and $y$ directions of oscillation are in resonance. Also the loading on the coupler terminals is decreased by a factor of four. Within an oriented system the beam motion in the input coupler section (a) still grows linearly with distance $z$ throughout the length $L_1$, as shown in FIG. 5.

In the input and output sections of the oriented system (FIGS. 7, 8, and 9) the grounded electrodes $53_{(a)} - 54_{(a)}$ and $53_{(c)} - 54_{(c)}$, shown in phantom, are intended to improve the electrostatic balancing of the containment fields (which are generated on containment electrodes 30–31 and 32–33) and increase the symmetry of the oriented system. Such additional electrodes may not be requisite to all types of oriented systems.

Although eight electrodes are provided in the over-all cross-section construction (FIGS. 7, 8, and 9), the device is simplified because the quadrupolar containment voltages are derived and connected to the containment electrodes 30–33 by a single exciting arrangement, and the input and output coupler sections (a) and (c) are isolated from one another both spacially and by use of insulation means such as other grounded shielding electrodes 52 placed along the zero potential lines of the quadrupole containment fields. As a result the containment quadrupole system of FIGS. 7, 8, and 9 is divided into separate longitudinal sections.

Figure 10:
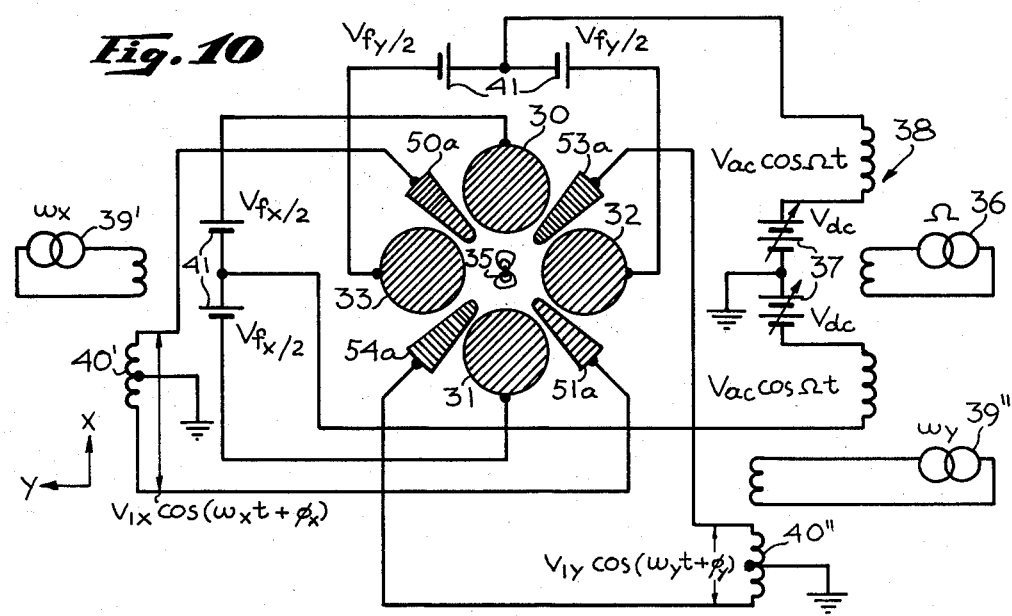
FIG. 10 is a modification of the input coupling arrangement shown in FIG. 8.

Further, it should be realized that for an octupole electrode configuration, as shown in FIG. 10, either pair of transverse signal or driving electrodes $50_{(a)}$–$51_{(a)}$ and $53_{(a)}$–$54_{(a)}$ can be energized. In this case the pair of driving electrodes $53_{(a)}$–$54_{(a)}$ are receptive of a transverse driving voltage rather than grounded as in FIGS. 8 and 9. As a result of such construction, when $V_{dc} \neq 0$ (i.e., $\omega_x \neq \omega_y$) then two different input signals of different frequency, as indicated in FIG. 4, may be applied separately or simultaneously to the electron beam 35. In this embodiment, driving signals are applied to each of the separate pairs of electrodes $50_{(a)}$–$51_{(a)}$ and $53_{(a)}$–$54_{(a)}$ by the signal or driving voltage sources 39′ and 39″ respectively. This results in a spiral-like motion of the electron beam 35, as shown in FIG. 10, and will require at the output coupler two pairs of detection electrodes $50_{(c)}$–$51_{(c)}$ and $53_{(c)}$–$54_{(c)}$ for detection of both signal frequencies. It should be realized that $\omega_x$ is effective only in the $x$ direction and $\omega_y$ is effective only in the $y$ direction. However, either pair of detection electrodes, if tuned to one of the frequencies $\omega_x$ or $\omega_y$, will absorb power from the electron beam 35.

By analogy, it should be noted that the operation discussed in connection with FIG. 10 is also applicable to FIG. 1; that is to say, the device shown in FIG. 1 is readily adapted to be energized at different frequencies $\omega_x$ and $\omega_y$. Moreover, either the construction shown in FIG. 1 or that shown in FIG. 7 may include two longitudinally adjacent coaxial driving sections (a) and two longitudinally adjacent coaxial detection sections (c).

In view of the above discussions it should be recognized that the embodiments shown in FIGS. 1 and 7 are functionally equivalent at least to the extent that the containment means is effectively divided into separate sections, with the division in FIG. 1 being by the gaps 34 and the division in FIG. 7 being by the separate oriented signal electrodes.

Low Noise Capabilities

The low noise feature of this quadrupole system results necessarily from the action of the input coupler section (a) in its ability to extract transverse power from the beam as it passes through the interaction region $L_1$. Thus as the electrons of the beam 35 pass into the input coupler section (a) with vibrational $x$ and $y$ noise oscillations, these oscillations induce currents in the external input circuit which are in turn dissipated in the input impedance of the signal source. Thermodynamically speaking, the beam is able to come into thermal equilibrium with the matched input impedance of the external driving voltage source 39. Accordingly, the input coupler section (a) serves the double function of both injecting the signal $\omega_1$ onto the electron beam 35 and stripping the initial transverse noise oscillations from the beam. For instance, when the driving source 39 includes a receiving antenna directed toward outer space, the noise at the output section (c) becomes a function of the temperature of space rather than a function of the temperature of the heated filament 21. Thus the noise component at the output may be expected to be on the order of 100° Kelvin rather than the 1200° Kelvin at the filament. On the other hand, the longitudinal noise components on the beam are not able to induce signals in either the output or input coupler sections except through small modifications on the transverse beam impedance $R_{(a)}$ or $R_{(c)}$ by variations of the longitudinal beam impedance $Z_b$ (see the Equation 33).

The Combination of Input and/or Output Coupler Sections as Electronic Devices It is the intention of the following paragraphs to emphasize that the combination of containment and transverse driving fields exemplified by the input and output coupler sections (a) and (c) by themselves constitute useful electronic devices, such as isolators, limiters, frequency converters, detectors, and voltage tunable oscillators.

Isolators and/or Limiters

The application as an isolator and/or limiter stems from the fact that variations in the loading across the output circuit do not in the least affect the loading on the signal source driving the input coupler section (a). The operation is strictly unilateral, and, because of the isolating means (such as the gaps 34), the input and output circuits are completely decoupled from one another with no feedback of power through the quadrupole system to the input circuit. Moreover, if the input power exceeds the capability of the structure, then the beam will terminate on the confining electrodes and no power will be delivered at the output shunt load 48. In such a coupling type device, the output power $P_{(c)}$ is strictly determined by the power handling capabilities of the electrode structure of the input coupler section (a) and the geometrically identical output coupler section (c).

Frequency Converters

The frequency conversion property of the combination of input and output coupler sections is derived from the fact that the beam vibrates coherently along either the $x$ or $y$ directions with frequencies $\omega_\beta$, $\Omega - \omega_\beta$, $\Omega + \omega_\beta$, etc. Thus signal power $P_{(a)}$ fed into the input coupler section (a) at angular frequency $\omega_\beta$ can be abstracted at the output circuit at frequency $\Omega - \omega_\beta$, or $\Omega + \omega_\beta$, etc. Such operation means that the quadrupole system functions as a unilateral up converter of the original signal frequency $\omega_\beta$. Similarly unilateral down conversion of the input signal frequency is equally feasible by supplying energy at $\Omega - \omega_\beta$ and extracting it at $\omega_\beta$. Use as either an up or down converter further means that the coupler lengths, the longitudinal beam velocity, or both, may be altered in order to obtain maximum loading or coupling of the electron beam 35 to the external circuits.

Voltage Tunable Oscillators

Figure 11:
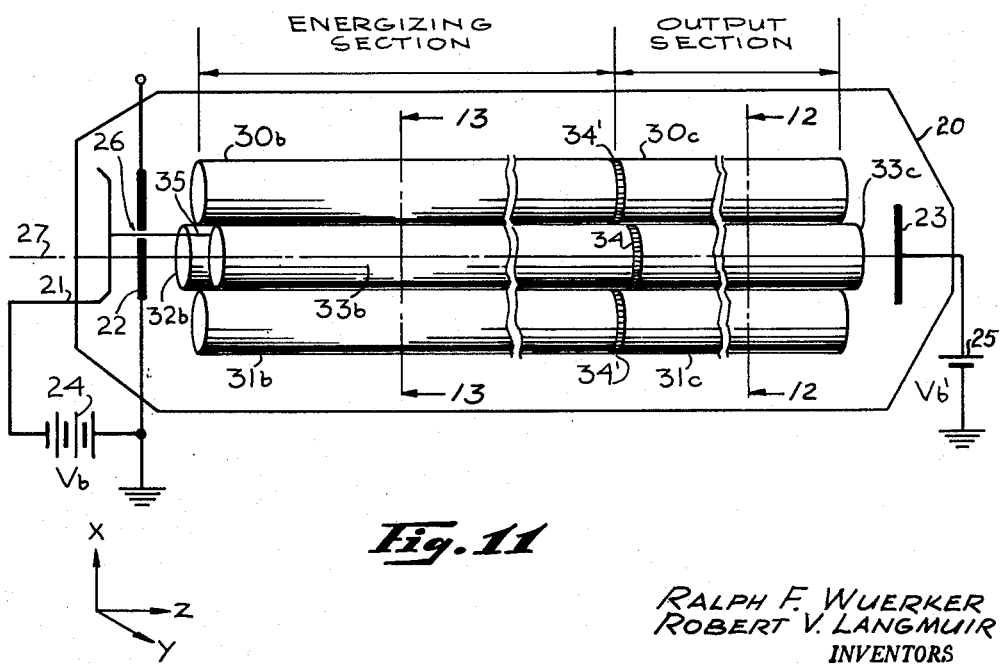
FIG. 11 is a schematic side view illustrating the utilization of the present invention as a voltage tunable oscillator.
Figure 12:
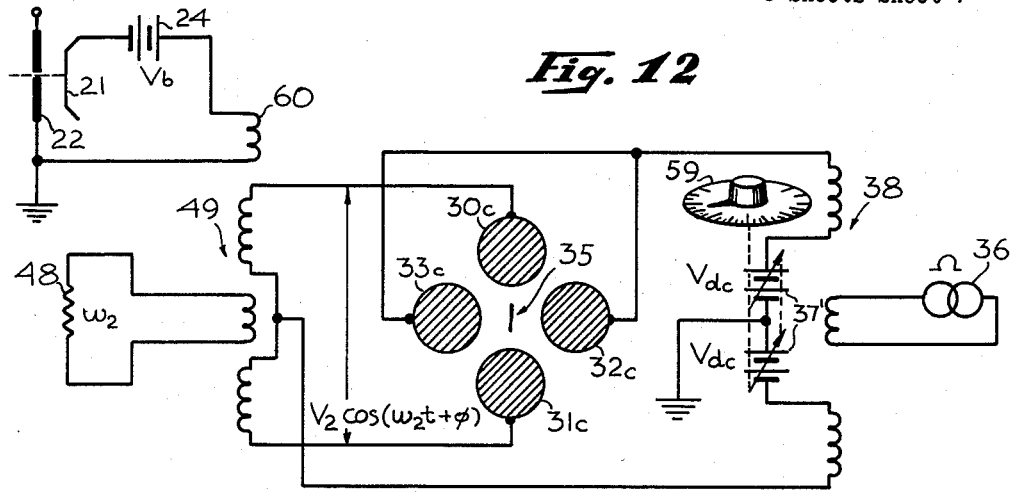
FIG. 12 is a cross-sectional view taken along the line 12—12 of FIG. 11 showing the voltage tunable output section.

The present invention, as shown in FIGS. 11 and 12, employing only an output coupler section (c) (with the containment fields $V_{ac}$ and $V_{dc}$) can be used as a voltage tunable oscillator or signal source. According to one method of operation, the electron beam 35 is given transverse energy by means such as an off-centered electron gun, or a skewed electron gun whose axis is not parallel to the axis 27 of the containment field, or both off-centered and skewed (the electron gun components being in the most simple case 21, 22, and 23). In this case the transverse energy imparted to the beam by voltage source 24 is abstracted by the output circuit as power $P_{(c)}$ at the resultant frequency of motion $\omega_\beta$ (or $\Omega - \omega_\beta$, etc.). Moreover, the frequency of this oscillator is controllable by as much as ±50% through variations in the magnitude of the undirectional voltage $V_{dc}$ from the source 37′ in FIG. 12. The tuning voltage control means 59 may take the form of a synchronized double potentiometer for securing a controlled and balanced $V_{dc}$ component to each pair of electrodes $30_{(c)}$–$31_{(c)}$ and $32_{(c)}$–$33_{(c)}$. Further, if it is desired to have linear time variation of the output frequency $\omega_2$, the magnitude of the frequency control voltage $V_{dc}$ can be varied by a sawtooth voltage generator such as a Miller integrator.

In this type (FIGS. 11 and 12) of transverse beam oscillator the longitudinal electron beam 35 can be treated in terms of right phased and wrong phased groups or portions of the electron stream. The right phase group constitutes those electrons which are delivering power $P_{(c)}$ to the output circuit shunt load 48. On the other hand, the wrong phase group will, if allowed to stay in the quadrupole system, absorb power ($P_{(a)}$) from the output circuit. The wrong phase group must be suppressed. This is achieved by either of the following two phenomena, namely, by either modulating the accelerating voltage $V_b$ by feedback to the accelerating electrode 22, or by injecting the electron beam 35 at near "grazing" incidence so that the wrong phase group will be quickly collected by the adjacent containment electrode surfaces. This grazing depletion of the undesired electron stream is automatic. On the other hand, the output signal feedback may be accomplished simply by adding a tertiary coupling means 60 to the coupling means 49 for varying the effect of $V_b$ on the electron flow between the heated filament 21 and the accelerating electrode 22 as a function of the output signal $V_2$.

Figure 13:
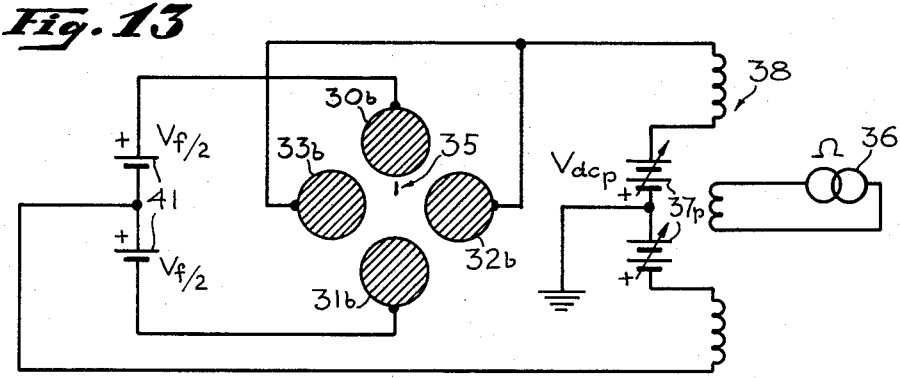
FIG. 13 is a cross-sectional view taken along the line 13—13 of FIG. 11 showing an input section of the oscillator of FIG. 11.

A second embodiment of this voltage tunable oscillator employs a second quadrupole electrode structure section ($b$) between the electron gun and the output coupler section ($c$). As shown in FIGS. 11 and 13, this structure has applied to it the alternating "containment" voltage $V_{ac}$ from the source 36, a unidirectional defocusing quadrupole voltage $V_{dc_p}$ from the source $37_p$, and a transverse voltage $V_f$ from source 41. This input section ($b$) differs from the output section ($c$) by the presence and magnitudes of the static transverse electric fields which are isolated from the output coupler section ($c$) by narrow capacity gaps (high pass filters), shown in FIG. 11 as 34'. The steering voltage $V_f$ source 41 serves to displace the electron beam 35 from the axis 27 while the defocusing voltage $V_{dc_p}$ source $37_p$ amplifies further this displacement. The defocusing voltage $V_{dc_p}$ is distinguishable from the tuning or frequency control voltage $V_{dc}$ because it is of a substantially larger magnitude so as to overcome the oscillating containment of the electron beam 35. The polarity and magnitude of the static quadrupole defocusing voltage source $37_p$ is chosen so that the electron beam 35 is unstable (i.e. outside of the cross-hatched area of FIG. 3) in the same plane as the transverse signal field $E_2$ in the output coupler section ($c$). Further, by adjusting the magnitude of the unidirectional voltage $V_{dc_p}$, one can control the magnitude of the output R-F signal power $P_{(c)}$. For this device, the wrong phase portion of the electron stream is suppressed in a manner explained in the previous paragraph.

*Application as a Signal Detector and/or Spectrum Analyzer*

Figure 14:
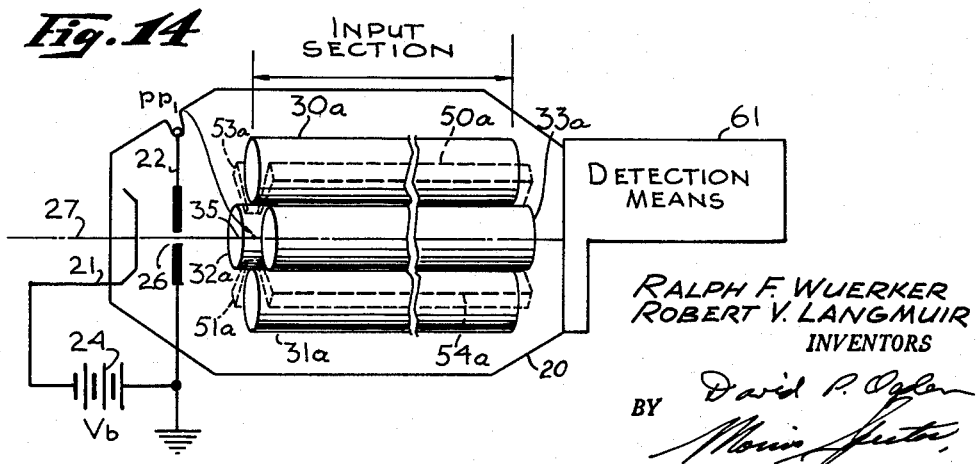
FIG. 14 is a schematic side view of an embodiment of the present invention usable as a detector.

Moreover, the input coupler section ($a$) (FIGS. 14, and 2 or 8) of the present invention by itself is adapted for utilization in various types of systems. For instance the signal voltage source 39 could include a radar receiving antenna directed toward an intermittent signal transmitter (not shown) requiring continuous monitoring. In the quadrupole system of FIG. 14, a detection means 61 for detecting the character of any transverse oscillations of the electron beam 35 replaces the above described output coupler section ($c$). The detection means 61 may take the form of an electronic camera and an image converter tube to record and preserve indicia of any phenomena causing excitation of the electron beam 35. When using a photographic film, the film in the camera is movable at a rate such as one inch per minute, and the system provides a permanent record of both the received signal $\omega_1$, timing of the signal, and the character of the signal. On the other hand, a permanent electronic storage medium such as a mosaic chargeable surface is also usable, and with the electron beam 35 being swept relatively slowly across the storage medium by $V_f$ (FIG. 2), one can obtain a similar record. Since electronic cameras operable in conjunction with image converter tubes (such as the RCA development type C 73435A) are known and electronic storage media are known, the details of these devices need not be discussed herein. An even simpler detector consists of an anode with a central target portion receptive only of the unexcited beam. The present invention is particularly adapted to such detection uses when the frequency of the intermittent signal transmitter is unknown because of the ability to sweep the frequency $\omega_1$ over a wide range by varying the frequency control voltage $V_{dc}$ (see the above discussion of FIG. 2 or FIG. 8).

If desired, the sweep voltage could be controllable so as to provide an automatic "lock on" at received signal frequency. It is also feasible to enhance such a detection function by the use of an amplifier section as discussed below.

*The Amplifier Section ($b$)*

In addition to the provision of useful input and output coupling functions, the present invention can be used as an amplifier. As discussed below, the combination of input and output coupler sections may be used as portions of an amplifying device. In order to achieve amplification, something must be done to increase further section ($b$) of the vibrational envelope 46 of the electron beam, as shown in FIG. 5, so that a proportionally greater amount of power $P_{(c)}$, as defined in the Equation 24 can be abstracted at the output coupler terminals. According to the present invention, other electric quadrupole fields are applied between the input and output sections to make the complete system function as a unilateral amplifying device.

Figure 15:
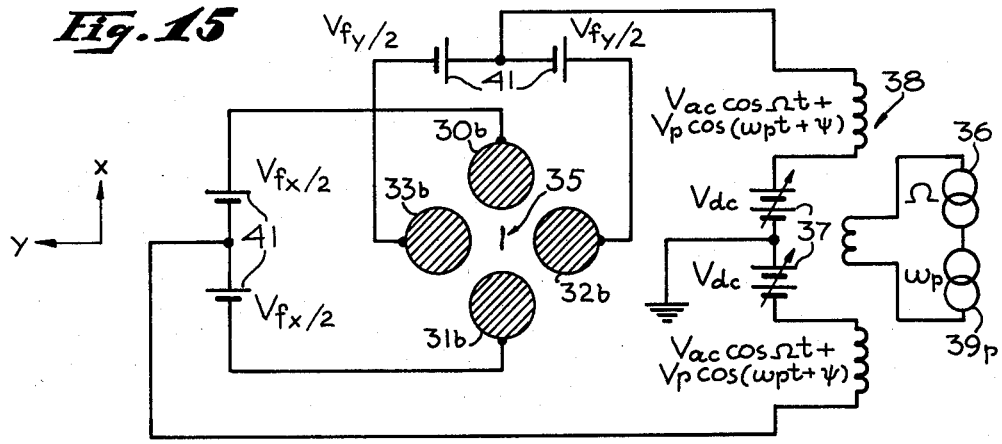
FIG. 15 is a cross-sectional view taken along the line 15—15 of FIG. 1 of a pumping or amplifying section for the present invention.

Consider first the amplifying or pumping section ($b$) shown in FIG. 1 and in cross-section in FIG. 15. In this case, the three quadrupolar fields due to the static frequency control voltage $V_{dc}$, the containment voltage $V_{ac}$, and an alternating pumping or amplifying voltage $V_p$ are all derived from power sources 36, 37, and $39_p$ and applied to quadrupole electrodes (specifically $30_{(b)}$–$31_{(b)}$ and $32_{(b)}$–$33_{(b)}$). This results in a doubly resonant tuned circuit or cavity-like apparatus which generates the alternating component fields at angular frequencies of both $\Omega$ and $\omega_p$. The quadrupole electric fields within the electrode structure of the amplifying section ($b$) are in this example specified by the potential distribution:

$$V(x,y,t) = \{\pm V_{dc} - V_{ac} \cos \Omega t - V_p \cos (\omega_p t + \psi)\}\left\{\frac{x^2 - y^2}{r_0^2}\right\} \tag{40}$$

The differential equations of motion of a single electron in these three quadrupolar fields now become:

$$\frac{d^2x}{dt^2} + 2\frac{e}{m}\left\{\pm\frac{V_{dc}}{r_0^2} - \frac{V_{ac}}{r_0^2}\cos \Omega t\right\}x = 2\frac{e}{m}\frac{V_p}{r_0^2}x \cos(\omega_p t + \psi) \tag{41}$$

and $$\frac{d^2y}{dt^2} - 2\frac{e}{m}\left\{\mp\frac{V_{dc}}{r_0^2} - \frac{V_{ac}}{r_0^2}\cos \Omega t\right\}y = -2\frac{e}{m}\frac{V_p}{r_0^2}y \cos(\omega_p t + \psi) \tag{42}$$

where $\psi$ is the phase angle.

The stable behavior of the left-hand side of the above equations (i.e., when $V_p = 0$) has already been described. The presence of the second alternating quadrupolar field (due to $V_p$) adds a very severe degree of complexity, especially when one realizes that $\omega_p$ and $\Omega$ are not necessarily related in a true harmonic sense. To the first order of approximations, the equations are amenable to solution. Accordingly, one replaces the left-hand side of either Equation 41 or 42 by an equation of simple harmonic motion with the angular frequency of harmonic motion being set equal to the resultant or $\omega_\beta$ frequency of the stable Mathieu motion. For example, in the case of the motion along the $x$ direction one now rewrites the Equation 41 as follows:

$$\frac{d^2x}{dt^2}+\omega_{\beta_x}^2 x-2\frac{e}{m}\frac{V_p}{r_0^2}\{\cos\omega_p t\}x=0 \qquad (43)$$

The reasoning in this case follows from intuition gained earlier whereby one interprets the containing quadrupole electric fields as establishing an equivalent or effective harmonic binding of the electron beam 35 about the axis 27 of the quadrupole system. Although lacking in mathematical rigor, the above mathematical approximation is acceptable when $$V_p < V_{ac} \text{ and } q_u \lesssim 0.6$$

Thus, in passing from the Equation 41 to the Equation 43, the original very difficult equation of motion (41) has been reduced again to a Mathieu equation. In this case the interest is now centered upon the resonant or unstable behavior of the Equation 43. The formal analysis shows that the approximate differential equation has exponentially growing solutions with time whenever $$\omega_p \simeq 2\omega_{\beta_x}/n$$
$$n \neq 0 \qquad (44)$$

That is to say, when the frequency of the exciting quadrupolar field is twice the resultant frequency of motion (i.e., $\omega_p=2\omega_{\beta_x}$), equal to the resultant frequency ($\omega_p=\omega_{\beta_x}$), equal to two-thirds the resultant frequency (i.e., $\omega_p=2\omega_{\beta_x}/3$), etc., then the exciting field supplies energy into the transverse motion of the charged particles of the beam. Similarly, it can be shown that resonance along the $y$ direction of motion can be excited whenever $$\omega_p=2\omega_{\beta_y}/n$$
$$n \neq 0 \qquad 45$$

When $V_p$ is small compared to $V_{ac}$ and $\omega_p=2\omega_{\beta_x}$ (i.e., $n=1$ in the Equation 44), the approximate differential equation of motion (Equation 43) has an unstable solution of the form $$X(t)=A\left\{\sin\left(\omega_{\beta_x}t-\frac{\pi}{4}\right)\right\}\exp\left\{\frac{1}{2}\left(\frac{e}{m}\right)\left(\frac{V_p}{r_0^2}\right)\left(\frac{t}{\omega_{\beta_x}}\right)\right\}$$
$$+B\left\{\sin\left(\omega_{\beta_x}t+\frac{\pi}{4}\right)\right\}\exp\left\{-\frac{1}{2}\left(\frac{e}{m}\right)\left(\frac{V_p}{r_0^2}\right)\left(\frac{t}{\omega_{\beta_x}}\right)\right\}$$
$$(46)$$

where A and B are constants of integration whose values are determined by the phase of the exciting field $E_p$ with respect to the resultant frequency of oscillation of the beam as it enters into the amplifying section at $t=0$, and exp is the base of the natural system of logarithms (2.718 . . . ). If the phase and the frequency are properly selected, coherence is maintained and all of the electrons, energized by the input section ($a$), will be accelerated with increasing transverse amplitude as energy is supplied to the electron beam 35 from the exciting source $39_p$ (FIG. 15). In this specific case, $B=0$ in the above equation, and the solution as a function of time and longitudinal distance $z$ into the amplifying section ($b$) has the form $$X(z,t)=X_1\{\cos(\omega_{\beta_x}t+\phi)\}\exp\left\{\frac{1}{2}\left(\frac{e}{m}\right)\left(\frac{V_p}{r_0^2}\right)\left(\frac{z}{v_z}\right)\left(\frac{1}{\omega_{\beta_x}}\right)\right\}$$
$$(47)$$

where $v_z$ is the longitudinal beam velocity and $X_1$ is the maximum amplitude of $x$ displacement imparted to the electron beam 35 during its passage through the input coupler section ($a$).

The Equation 47 by the very nature of its derivation has neglected the other frequency components ($\Omega-\omega_{\beta_x}$, $\Omega+\omega_{\beta_x}$, etc.) due to the stable vibrations of the coherent electron beam 35 in the containment field. These will be present, and, to be more exact, the cos $(\omega_{\beta_x}t+\phi)$ term in the above equation should be replaced by $$\sum_{n=-\infty}^{\infty}\frac{C_{2n}}{C_0}\cos[(n\Omega+\omega_{\beta_x})t+\phi]$$

Since the power in a vibrating coherent beam is proportional to the square of the maximum $x$ displacement according to the Equation 24, a thirty-three fold increase in $x$ displacement of the beam by the amplifying section ($b$) would correspond to an approximate power gain of 30 decibels (i.e., 30 db). This is illustrated in FIG. 5 which shows the extreme boundary 46 of the vibrating electron beam 35 as it passes through the complete combination of input coupler section ($a$), amplifier section ($b$), and output coupler section ($c$).

When $\omega_p=2\omega_\beta$, the power gain experienced by the electron beam during its passage through the amplifier section ($b$) can be written from the Equation 44 as $$\text{Power Gain in db}\simeq 4.34\left(\frac{e}{m}\right)\left(\frac{V_p}{r_0^2}\right)\left(\frac{L_p}{v_z}\right)\left(\frac{1}{\omega_\beta}\right)$$
$$\omega_p=2\omega_\beta \qquad (48)$$

where $L_p$ is the length of the interaction region of the amplifier section ($b$) (see FIG. 5).

Further, if one assumes that $$q_u \lesssim 1/2 \text{ and } \beta \simeq q_u/\sqrt{2}$$

(i.e., $a_u$ is approximately zero), then the above expression for the gain can be further simplified:

$$\text{Power Gain in db}\simeq 3\left(\frac{V_p}{V_{ac}}\right)\left(\frac{L_p}{v_z}\right)\Omega \qquad (49)$$
$$\omega_p=2\omega_\beta$$

remembering that the longitudinal beam velocity $v_z$ is related to the accelerating potential $V_b$, i.e., $$v_z=\sqrt{2V_b e/m}$$

The Equation 49 naturally assumes that $V_p<V_{ac}$, as discussed above in connection with the Equations 41 and 43. For example if $\Omega/2\pi=1000$ megacycles, $L_p=1$ inch, and $V_b=50$ volts, then the gain becomes approximately 120 $V_p/V_{ac}$ db.

When $\omega_p=\omega_\beta$ (i.e., $n=2$), the analysis shows that the power gain per unit length is less than the above case in which $n=1$. Calculation shows, assuming $V_p<V_{ac}$, that the power gain is:

$$\text{Gain in db}=0.27\left(\frac{V_p}{V_{ac}}\right)^2\left(\frac{L_p}{v_z}\right)\left(\frac{\Omega}{\beta}\right) \qquad (50)$$
$$\omega_p=\omega_\beta$$

Similarly, when $\omega_p=2\omega_\beta/3$, the power gain can be shown to be $$\text{Gain in db}=\frac{1}{100}\left(\frac{V_p}{V_{ac}}\right)^3\left(\frac{L_p}{v_z}\right)\left(\frac{\Omega}{\beta^2}\right) \qquad (51)$$
$$\omega_p=2\omega_\beta/3$$

illustrating that the gain per unit length for the various modes is proportional to $(V_p/V_{ac})^n$. Even though the gain per unit length is smaller as $n$ increases, this does not necessarily preclude operating at higher values of $n$ because, for instance, the length of the quadrupole system can be made much longer than the one inch previously suggested. Since the gain is largest for $\omega_p=2\omega_\beta$, operation under this condition will be considered as the normal method.

Further, it should be realized that (when $V_{dc}=0$), the above power gain expressions of the Equations 48, 49, 50, and 51 can be effectively doubled by applying the detected output signal $\omega_{2x}$ back onto the orthogonal input coupler electrodes as a driving signal $\omega_{1y}$, amplifying it, and taking it finally as a doubly amplified signal $\omega_{2y}$ from the orthogonal ouput coupler terminals. Thus the amplification of a 20 db amplifier can be extended to 40 db.

Moreover, it should be recognized that the frequency control voltage source 37 may include signal information, with the result that the amplifier (sections $(a)$, $(b)$, and $(c)$) becomes a frequency modulation device.

The Octupole Amplifier Section $(b)$

Figure 16:
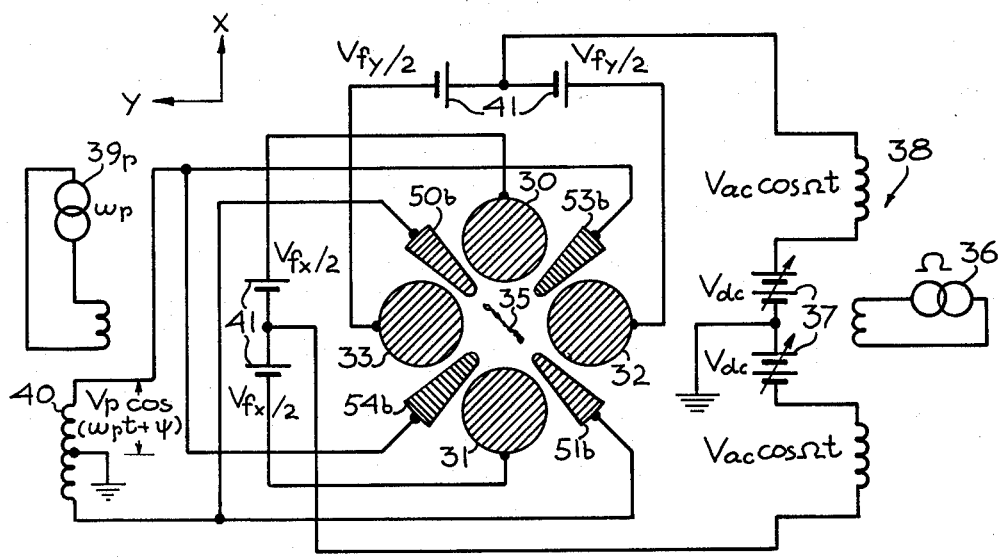
FIG. 16 is a cross-sectional view of a pumping or amplifying section taken along the line 16—16 of FIG. 7.

In order to separate and isolate electrically the quadrupole amplifying field $E_p$ described above from the containment quadrupole fields, an octupole electrode structure may again be employed. The amplifier section $(b)$ of this type is exemplified in the central portion of FIG. 7 and is shown in cross-section in FIG. 16. As mentioned in the discussion of the input coupler section $(a)$, the two fields $E_1$ and $E_p$ are now geometrically isolated from one another so that each can be derived from separate and independent tuned circuits or resonant cavities. Thus in FIG. 16 the electrodes 30–31 and 32–33 provide (as in the input and output coupler sections, FIGS. 8, 9, and 10) the balanced alternating and unidirectional containment fields, while the electrodes $50_{(b)}$–$51_{(b)}$ and $53_{(b)}$–$54_{(b)}$ provide the alternating quadrupolar amplifying field $E_p$. The orientation of the two quadrupole fields at 45° with respect to one another adds an even greater degree of complexity to the formal mathematical treatment of the differential equations of motion of the individual electrons. However, by using the concept of the equivalent harmonic binding of the electron beam to the axis 27 of the electrode structure by the containment fields, the conditions for resonance and the power gain per unit length are found to be substantially the same as before, as stated in the Equations 44, 45, 48, and 49. The exact mathematical details of this type of amplifier, although interesting from a physics standpoint, are not necessary in understanding the operation of the octupolar amplifier section $(b)$. As a result of the electrodynamic fields present, the electron beam 35 is contained in accordance with the voltages $V_{ac}$ and $V_{dc}$ and is amplified in accordance with the voltage $V_p$ from the source $39_p$ connected to the second quadrupole system by means of a resonant means shown schematically as the transformer 40.

Amplification with Quadrupole Unidirectional Fields

Once the electron beam 35 is contained in accordance with the present invention and excited slightly by the input coupler section $(a)$, it has been found that one can also increase the transverse oscillations of the electron beam by accelerating it with an electrostatic defocusing quadrupole field $E_{dc_p}$; for example, in the case of the amplifying section shown in FIG. 17, the operating point in the $a_u$–$q_u$ plane of FIG. 3 is now either above or below the $\beta_x=0$ or $\beta_y=0$ lines, depending upon which one of the two independent directions of motion is unstable. Thus, by focusing in one direction, such as the $y$ direction, and defocusing in another, such as the $x$ direction (FIG. 17), any lateral displacement of the electron beam 35 in the $x$ direction will be further enhanced. The growing part of the motion of the individual electrons is shown (by McLachlan cited above) to be:

$$u(t) = A\left\{1 - \frac{q}{2}\cos\omega t \ldots\right\}\exp\left\{\frac{t}{r_0}\sqrt{2V_{dc_p}\left(1 - \frac{q_u V_{ac}}{4V_{dc_p}}\right)\left(\frac{e}{m}\right)}\right\} \quad (52)$$

The increasing displacement of the electron beam 35 in this case manifests itself as a power drain from the unidirectional source $37_p'$ of the defocusing voltage $V_{dc_p}$. The power gain of the electron beam 35 as it passes through the unstable interaction region is found to be:

$$\text{Gain in db} \underset{\omega_p=0}{\sim} 12\frac{L_p}{r_0 v_z}\sqrt{V_{dc_p}\left(\frac{e}{m}\right)\left(1 - \frac{q_u V_{ac}}{4V_{dc_p}}\right)} \quad (53)$$

Writing the longitudinal velocity $v_z$ in terms of the accelerating potential $V_b$ then reduces the above equation to:

$$\text{Gain in db} = 8.68\frac{L_p}{r_0}\sqrt{\frac{V_{dc_p}}{V_b}\left(1 - \frac{q_u V_{ac}}{4V_{dc_p}}\right)} \quad (54)$$

Figure 17:
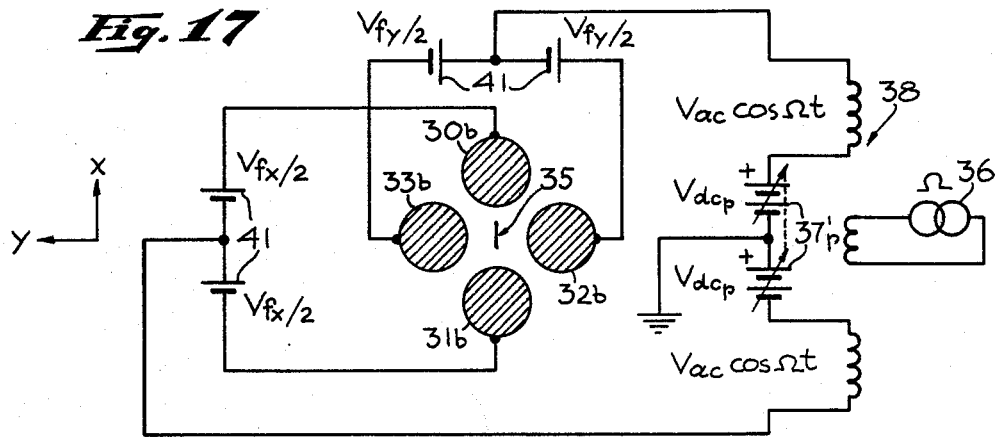
FIG. 17 is a modification of the pumping or amplifying section shown in FIG. 15.

According to the Equation 54, clearly the gain is the greatest when $V_{ac}=0$ so that the amplifying section $(b)$ constitutes nothing more than a unidirectional voltage applied to the linear quadrupole electrode structure, as shown in FIG. 17.

Figure 18:
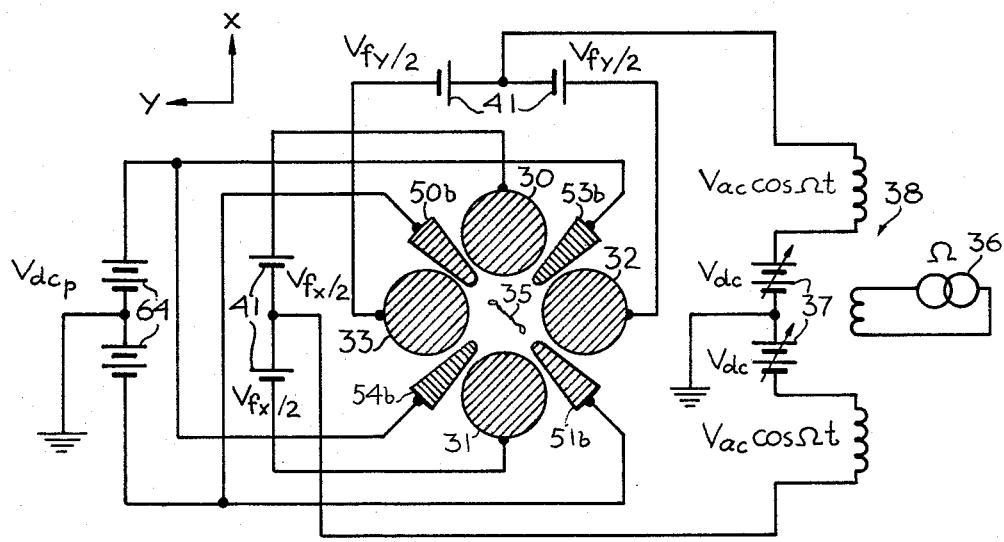
FIG. 18 is a modification of the pumping section combining features of both FIGS. 7 and 17.

Similarly, one can also amplify by applying the static quadrupole defocusing force $E_{dc_p}$ to the oriented system shown in FIG. 18 wherein the defocusing voltage $V_{dc_p}$ is applied to the amplifier electrodes $50_{(b)}$–$51_{(b)}$ and $53_{(b)}$–$54_{(b)}$ from the unidirectional voltage source 64.

It should be noted that any of the above amplifier sections are adaptable for double frequency operation (at two or more frequencies) by the use of two or more pumping voltages $V_p$, $V_p'$, etc. However, when two separate driving voltages $$V_{\omega\beta_x}$$

and $$V_{\omega\beta_y}$$

are utilized, it may be preferred that two separate amplifying and coaxially aligned sections $(b)$ are used, with the sections sequentially spaced along the longitudinal axis 27 of the system with one section driven at $2\omega_{\beta_x}$ and the other section driven at $2\omega_{\beta_y}$, so that one section amplifies lateral displacement created by one pair of driving electrodes and the next section amplifies the lateral displacement created by another pair of driving electrodes.

Displacing Fields

It should also be realized that subsidiary transverse unidirectional fields can be added across the confining electrode structure as a function of the voltage $V_f$ for the purpose of either displacing or steering the electron beam 35 either away from or toward the axis 27. The sources 41 of these unidirectional transverse electric fields $V_f$ are connected across opposing confining electrode surfaces (30–31 or 32–33 in FIGS. 1 and 7). Thus, for example, source $V_{f_x}$ can serve to displace the electron beam 35 in either the plus or minus $x$ direction depending upon its polarity, while $V_{f_y}$ acts independently on the electron beam in the $y$ direction.

Such transverse forces modify the original Mathieu differential equations of containment as defined in the Equation 4 by the addition on the right-hand side of a constant term F, namely:

$$\frac{d^2u}{d\xi^2} + (a_u - q_u \cos 2\xi)u = F \quad (55)$$

where the normalized transverse force F is related to the transverse electrical force through the equation:

$$F = 2\left(\frac{e}{m}\right)\left(\frac{V_{f_u}}{r_0}\right)\frac{1}{\Omega^2} \quad (56)$$

The complete solution of Equation 55 is the sum of the particular integral due to the constant term F and the complementary function of the Equation 8. Mathematical analysis shows that within the first region of stability the particular integral of the Equation 55 in normalized form is closely:

$$U(t) \simeq \frac{F}{\beta^2}\left[1 - \frac{2a_u}{(4-a_u)}\cos 2\xi - \frac{2q_u^2}{(6-a_u)(4-a_u)}\cos 4\xi \ldots\right] \quad (57)$$

demonstrating that the uniform transverse force F displaces the center of motion of the detection beam 35 by an amount proportional to the magnitude of $V_f$ and inversely proportional to the square of the resultant frequency $\omega_\beta$ of motion. Thus for the present invention the displacement of the center of motion when the transverse field is applied along the $x$ direction is approximately:

$$Xf \simeq \frac{1}{2}\left(\frac{e}{m}\right)\left(\frac{V_{f_x}}{r_0}\right)\left(\frac{1}{\omega_{\beta_x}^2}\right) \quad (58)$$

Bandwidth Considerations

The electric quadrupole systems which have been described above are all basically narrow band devices. The frequency bandwidth ($2\Delta\omega_1$) of the input section ($a$) or ($2\Delta\omega_2$) of the output section ($c$) is determined essentially by the transit time, respectively $t_{z_1}$ or $t_{z_2}$, of the particles of the beam through the respective coupler sections, specifically $$\Delta\omega \lesssim \pm \frac{\pi}{4t_z} \qquad (59)$$

where $$t_{z_1} = t_1/v_z$$

etc.

Thus, if the electron beam 35 is influenced by only a few cycles of the signal frequency $\omega_1/2\pi$, the bandwidth will be on the order of 5% of the mid frequency $\omega_1$. Conversely, if the electron beam 35 is within a coupler section for 30 or more cycles, the bandwidth will be .1% of the mid frequency $\omega_1/2\pi$. However, the narrow bandwidth characteristics are not detrimental in any of these devices, because the signal frequency $\omega_1/2\pi$ can be rapidly swept from one value to the next through either variation in magnitude of $V_{dc}$ or variation in magnitude of $V_{ac}$, or both.

The previous discussion has shown how an alternating electric quadrupole field can be used to "harmonically" bind an electron beam to the axis of the electrode system; how transverse signal energy is added in the regime of the input coupler section ($a$) by a transverse alternating electric field; how the input energy is stored in the electron beam 35 as coherent transverse vibrations or oscillations; how this energy is increased by a second quadrupole electric field in the regime of the amplifying or pumping section ($b$); how all of the transverse energy is abstracted in the regime of the output coupler section ($c$) when it is critically matched to the external circuit; and several specific uses of the present invention.

While there have been shown and described above particular embodiments of this invention, other modifications may occur to those skilled in the art. For instance, if it is desired to use an amplifying system of this general construction at substantially lower frequencies, the electron beam 35 may be replaced by a charged particle beam such as an ion beam and the electron source or filament 21 may be replaced by a charged particle source. Moreover, the particular electrode configurations are intended to be representative rather than limiting. Thus in certain amplifier embodiments, the amplifier cross-sectional dimension might be greater than those of the input coupler section, and the electrode cross-sectional configuration (the electrode 30 compared to the electrode 51) as shown in FIG. 7 might be interchanged or otherwise modified. Furthermore, it is recognized that, despite rather complex distortion problems, it is possible to provide an amplifying device in accordance with the present invention by the use of only an input coupler section ($a$) and an output coupler section ($c$) placed in a spaced-apart coaxial relation. As a result, the transverse velocity $v_x$ will cause $X_2$ to be substantially greater than $X_1$. It is also realized that hexipolar and octupolar containment electrode systems are feasible for certain types of beam tubes. However, such containment electrode configurations, if energized by three or four phase sources of voltage $V_{ac}'$, will cause a certain interdependence of the signal voltages such as $V_x$, $V_{(y+60)}$, and $V_{(y-60)}$, so that excitation by a signal voltage $V_1$ will cause a spiral-like motion of the beam. Moreover, the mathematical discussion of such a multiphase system is more complex than that presented herein. Similarly, although it is recognized that the sinusoidal fields discussed herein may be replaced by rectangular or other wave forms, the mathematical treatment of any resulting fields is far more complex than that necessary for a complete understanding of the present invention. It is intended, therefore, by the appended claims to cover all such modifications as come within the true spirit and scope of the present invention.

What is claimed is:

1. An electron beam coupler tube comprising: an electron source for providing a beam of electrons; an accelerating and focusing electrode for directing said beam along a path longitudinally of the tube; an anode coaxial with said electrode receptive of the electrons passing along the path; longitudinal alternating electric field containment means including pairs of electrodes diametrically positioned relative to the axis for providing two dimensional transverse containment of said beam about the path between said focusing electrode and said anode; first electric circuit means for energizing said pairs of electrodes at a first frequency and at a voltage dependent upon the charge to mass ratio of said electrons and the relative transverse spacing of said pairs of electrodes, so that said beam is bound to the path by an alternate gradient focusing containment field; second electric circuit means for impressing a second transverse alternating electric field in a first section of the length of one of said pairs to impart transverse oscillations to said beam at a frequency which is a fraction of said first frequency, with said fraction being a function of the magnitude of the alternate gradient focusing voltage and the transverse spacing of said pairs; and third electric circuit means connected to a second section of said length for detecting the character of said transverse oscillations, said first and second sections being electrically distinct from each other.

2. An electron beam amplifying tube comprising: an electron gun for providing a relatively low velocity beam of electrons directed along a path longitudinally of the tube; an anode receptive of said beam; alternating electric field containment means centered around the path for providing two dimensional transverse containment of said beam between said gun and said anode; first electric circuit means connected for energizing said containment means at a frequency and voltage dependent upon the charge to mass ratio of the electrons and on the transverse spacing of said containment means so that said beam is bound to the path by alternate gradient focusing; second electric circuit means connected for impressing a second alternating electric field at a lower frequency in a first section of the length of said containment means to impart relatively small transverse oscillations to said beam; third electric circuit means for impressing an amplifying voltage in another section of the length of said containment means to increase any lateral deflection of said beam as a function of said relatively small transverse oscillations; and means for detecting the character of said increased lateral deflection.

3. An electron beam tube comprising: an electron gun for providing a beam of electrons directed along a path longitudinally of the tube; an anode receptive of the beam; longitudinal alternating electric field containment means for providing two dimensional transverse containment of said beam about the path between said gun and said anode; first electric circuit means connected for energizing said containment means at a frequency and voltage dependent upon the charge to mass ratio of the electrons and the transverse spacing of said containment means so that said beam is bound to the path by an alternate gradient focusing containment field; second electric circuit means connected to impress a second alternating electric field in a first section of the length of said containment means to impart relatively small transverse oscillations to said beam; third electric circuit means connected to impress an amplifying alternating electric field in a second section of the length of said containment means to increase the transverse oscillations of said beam as a function of said relatively small transverse oscillations; and a fourth electric circuit means connected to a third section of said length for detecting the character of said increased transverse oscillations.

4. An electron beam tube comprising: an electron gun for providing a beam of electrons along the longitudinal axis of the tube; a quadrupole alternating electric field containment means centered around the axis for providing two dimensional transverse containment of said beam; said containment means being divided into at least two electrically distinct spaced apart longitudinal sections including an input coupler and an output coupler; electric circuit means for energizing each section of said alternating electric field containment means to provide alternate gradient focusing of said beam, and second electric circuit means connected for impressing a transverse driving alternating electric field to said input section to impart transverse oscillations to said beam.

5. An electron beam tube comprising: an electron gun for providing a beam of electrons along the longitudinal axis of the tube; a quadrupole alternating electric field containment means centered around the axis for providing two dimensional transverse containment of said beam; said containment means being divided into two adjacent and coaxial longitudinal sections including an input coupler and an output coupler; first electric circuit means connected for energizing each section of said alternating electric field containment means to provide alternate gradient focusing of said beam about the axis; second electric circuit means connected for impressing a transverse driving alternating electric field to said input section to impart relatively small transverse oscillations to said beam; and a third electric circuit means connected to said output section for detecting any transverse deflection of said beam caused by said driving field.

6. An electron beam tube comprising: an electron gun for providing a beam of electrons along the longitudinal axis of the tube; a quadrupole alternating electric field containment means centered around the axis for providing two dimensional transverse containment of said beam; said containment means being divided into two spaced apart coaxial longitudinal sections including an input coupler and an output coupler; first electric circuit means connected for energizing each section of said alternating electric field containment means to provide alternate gradient focusing of said beam about the axis; second electric circuit means connected for impressing a transverse driving alternating electric field to said input section to impart relatively small transverse oscillations to said beam; and a third electric circuit means connected to said output section for detecting any transverse deflection of said beam caused by said driving field.

7. An electron beam coupler tube comprising: an electron gun for providing a beam of electrons directed along the longitudinal axis of the tube; an anode coaxial with said gun receptive of the electrons passing along the axis; longitudinal quadrupole alternating electric field containment means including pairs of electrodes diametrically positioned relative to the axis for providing two dimensional transverse containment of said beam about the axis between said gun and said anode; said pairs of electrodes being divided by insulation means into longitudinal sections including a first section and a second section along the length of said containment means; first electric circuit means connected by impedance matching means for energizing each section of said pairs of electrodes at a first frequency and at a voltage dependent upon the charge to mass ratio of said electrons and upon the relative transverse spacing of said pairs so that said beam is bound to the axis in each section by alternate gradient focusing; second circuit means for impressing a second alternating electric field establishing voltage to one of said pairs of electrodes in said first section of said length to impart transverse oscillations to said beam at a frequency which is a fraction of said first frequency, with said fraction being a function of the magnitude of the alternate gradient focusing voltage and the spacing of said pairs; and third electric circuit means connected to said one pair of longitudinal electrodes in said second section of said length for detecting the character of said transverse oscillations.

8. An electron beam tube comprising: an electron source for providing a beam of electrons; an accelerating and focusing electrode for directing said beam along the longitudinal axis of the tube; an anode receptive of the electrons passing along the axis; longitudinal quadrupole alternating electric field containment electrodes including pairs of electrodes diametrically positioned relative to the axis for providing two dimensional transverse containment of said beam about the axis between said focusing electrode and said anode; said pairs of electrodes being divided into at least two longitudinal sections; first electric circuit means connected by resonant means for energizing a first of said sections at a first frequency and at a voltage dependent upon the charge to mass ratio of said electrons and the relative transverse spacing of said longitudinal electrodes so that said beam is bound to the axis therein by alternate gradient focusing; second electric circuit means connected to one of said pairs of electrodes for impressing a second alternating voltage in said first section to impart transverse oscillations to said beam at a frequency which is a function of said first frequency, with said function being dependent upon the magnitude of the alternate gradient focusing voltage and the transverse spacing of said pairs of electrodes; and third electric circuit means connected to each of said pairs of electrodes in said second portion of said length for impressing a unidirectional voltage thereon to amplify any displacements caused by said oscillations.

9. An electron beam tube comprising: an electron source for providing a beam of electrons; an accelerating and focusing electrode for directing said beam along the longitudinal axis of the tube; an anode receptive of the electrons passing along the axis; longitudinal quadrupole alternating electric field containment electrodes including pairs of electrodes diametrically positioned relative to the axis for providing two dimensional containment of said beam centered around the axis between said focusing electrode and said anode; said pairs of electrodes being divided into at least two longitudinal sections; first electric circuit means connected by resonant means for energizing each of said sections at a first frequency and at a voltage dependent upon the charge to mass ratio of said electrons and the relative transverse spacing of said longitudinal electrodes so that said beam is bound to the axis therein by alternate gradient focusing; second electric circuit means connected for impressing a second alternating voltage on one of said pairs of electrodes in said first section to impart transverse oscillations to said beam at a second frequency which is a function of said first frequency, with said function being dependent upon the magnitude of the alternate gradient focusing voltage and the spacing of said pairs of electrodes; and third electric circuit means connected to each of said pairs of electrodes in said second portion of said length for impressing a unidirectional voltage thereon to amplify any displacements caused by said oscillations.

10. An electron beam amplifying tube comprising: an electron source for providing a beam of electrons; a focusing electrode having a relatively low accelerating voltage thereon for directing said beam along the longitudinal axis of the tube; an anode receptive of said beam; quadrupole alternating electric field containment means including two pairs of parallel elongated electrodes radially spaced from the axis for providing two dimensional transverse containment of said beam between said focusing electrode and said anode, said containment means being divided into longitudinal sections by insulation means in said pairs of electrodes; first electric circuit means connected by coupling means to each of said sections for energizing said containment means at a first frequency and voltage dependent upon the charge to mass ratio of the electrons and on the transverse spacing of said pairs of electrodes so that said beam is bound to the axis by an alternate gradient focusing containment field; second electric circuit means connected to one of said pairs of electrodes for impressing a second alternating electric field establishing voltage at a lower frequency in a first of said sections to impart transverse oscillations to said beam; third electric circuit means connected to both of said pairs for impressing an amplifying electrodynamic voltage in a second of said sections at a frequency twice that of said second electric circuit means to increase said transverse oscillations; and means for detecting the character of said increased transverse oscillations.

11. An electron beam tube comprising: an electron gun for providing a beam of electrons directed along the longitudinal axis of the tube; an anode receptive of the electrons; alternating electric field containment means for providing two dimensional transverse containment of said beam about the axis between said gun and said anode, said containment means being divided into longitudinal sections; first electric circuit means for energizing each section of said containment means at a frequency and voltage dependent upon the charge to mass ratio of the electrons and the spacing of said containment means so that said beam is bound to the axis by an alternate gradient focusing containment field; second electric circuit means for impressing a second alternating electric field establishing voltage to a first of said sections to initiate relatively small transverse oscillations of said beam; third electric circuit means for impressing an amplifying alternating electric field establishing voltage to a second of said sections to increase the transverse oscillations of said beam as a function of said initial transverse oscillations; and a fourth electric circuit means connected to a third of said sections for absorbing power from said increased transverse oscillations.

12. An electron beam tube comprising: an electron gun for providing a beam of electrons directed along the longitudinal axis of the tube; an anode receptive of the electrons; alternating electric field containment means for providing two dimensional transverse containment of said beam about the axis between said gun and said anode, said containment means being divided into longitudinal sections; first electric circuit means for energizing each section of said containment means at a frequency and voltage dependent upon the charge to mass ratio of the electrons and the transverse spacing of said containment means so that said beam is bound to the axis by alternate gradient focusing; second electric circuit means for impressing a second alternating electric field establishing voltage to a first of said sections to initiate relatively small transverse oscillations of said beam; third electric circuit means for impressing an amplifying unidirectional voltage to a second of said sections to increase the transverse oscillations of said beam as a function of said initial transverse oscillations; and a fourth electric circuit means connected to a third of said sections for absorbing power from said increased transverse oscillations.

13. An electron beam tube comprising: an electron gun for providing a beam of electrons directed along the longitudinal axis of the tube; an anode receptive of the electrons; alternating electric field containment means for providing two dimensional transverse containment of said beam about the axis between said gun and said anode, said containment means being divided into first, second, and third aligned longitudinal sections; first electric circuit means for energizing said first and said third of said sections of said containment means at a frequency and voltage dependent upon the charge to mass ratio of the electrons and the transverse spacing of said containment means so that said beam is bound to the axis by alternate gradient focusing; second electric circuit means for impressing a second alternating electric field establishing voltage to said first section to initiate relatively small transverse oscillations of said beam; third electric circuit means for impressing an amplying unidirectional voltage to said second section to increase any lateral deflections as a function of said initial transverse oscillations; and a fourth electric circuit means connected to said third section for absorbing power from said increased lateral deflections.

14. A charged particle beam modulating device comprising: a source providing a beam of charged particles; an elongated alternating electric field containment means for providing two dimensional transverse containment of the beam about the longitudinal axis of said containment means, said containment means being divided into first and second spaced apart longitudinal coupler sections; first electric circuit means for energizing each section of said containment means at a frequency and voltage dependent upon the charge to mass ratio of the charged particles and the lateral spacing of said containment means so that the beam is bound to the axis by an alternate gradient focusing containment field; second electric circuit means for impressing a second alternating electric field establishing voltage in said first section to impart relatively small transverse oscillations of the beam; third electric circuit means for impressing an amplifying unidirectional voltage between said coupler sections to increase the lateral deflection to the beam as a function of said relatively small transverse oscillations; and a fourth electric circuit means connected to said second section for detecting the character of said increased lateral deflection.

15. A charged particle beam oscillating device comprising: a source providing a beam of charged particles; an elongated alternating electric field containment means for providing two dimensional transverse containment of the beam about the longitudinal axis of said containment means, said containment means being divided into two longitudinal sections; first electric circuit means for energizing each section of said containment means at a frequency and voltage dependent upon the charge to mass ratio of the charged particles and the lateral spacing of said containment means so that the beam is attracted to the axis by an alternate gradient focusing containment field; second electric circuit means for impressing a unidirectional defocusing voltage in the first of said sections to cause lateral deflection of the beam; and a third electric circuit means connected to the second of said sections for absorbing power as a function of said lateral deflection and at a frequency dependent upon the character of the containment field thereof.

16. A charged particle beam oscillating device comprising: a source providing a beam of charged particles; an elongated alternating electric field containment means for providing two dimensional transverse containment of the beam about the longitudinal axis of said containment means; first electric circuit means for energizing said containment means at a frequency and voltage dependent upon the charge to mass ratio of the charged particles and the lateral spacing of said containment means so that the beam is attracted to the axis by an alternate gradient focusing containment field; means connected to said source and said containment means for imparting lateral displacement to the beam prior to its entry into said containment means; and other electric circuit means connected to said containment means for absorbing power as a function of said lateral displacement and at a frequency dependent upon the character of the containment field thereof.

17. A charged particle beam oscillating device comprising: a source providing a beam of charged particles; an elongated alternating electric field containment means for providing two dimensional transverse containment of the beam about the longitudinal axis of said containment means; said beam source being oriented to provide a stream of charged particles which is laterally displaced from said axis at the input end of said containment means;

first electric circuit means for energizing said containment means at a frequency and voltage dependent upon the charge to mass ratio of the charged particles and the lateral spacing of said containment means so that the beam is attracted to the axis by an alternate gradient focusing containment field; and other electric circuit means connected to said containment means for absorbing power as a function of said lateral displacement and at a frequency dependent upon the character of the containment field thereof.

18. A charged particle beam oscillating device comprising: a source providing a beam of charged particles; an elongated alternating electric field containment means for providing two dimensional transverse containment of the beam about the longitudinal axis of said containment means; first electric circuit means for energizing said containment means at a frequency and voltage dependent upon the charge to mass ratio of the charged particles and the lateral spacing of said containment means so that the beam is attracted to the axis by an alternate gradient focusing containment field; means connected to said source and said containment means for imparting lateral displacement to the beam prior to its entry into said containment means; and second electric circuit means connected to said containment means for absorbing power as a function of said lateral displacement and at a frequency dependent upon the character of the containment field thereof, said lateral displacement being such that a portion of the particles entering said containment means contact a portion of the containment means and are thus lost from the beam whereby out of phase portions of the beam will not draw substantial power from said power absorbing second electric circuit means.

19. A charged particle beam oscillating device comprising: a source providing a beam of charged particles; an elongated alternating electric field containment means for providing two dimensional transverse containment of the beam about the longitudinal axis of said containment means; said beam source being oriented to provide a stream of charged particles which is laterally displaced from said axis at the input end of said containment means; first electric circuit means for energizing said containment means at a frequency and voltage dependent upon the charge to mass ratio of the charged particles and the lateral spacing of said containment means so that the beam is attracted to the axis by an alternate gradient focusing containment field; second electric circuit means connected to the second of said sections for absorbing power as a function of said lateral displacement and at a frequency dependent upon the character of the containment field thereof; and third electric circuit means connected between said second electric circuit means and said source for reducing the density of the beam to suppress wrong phased charged particle flow.

20. An electron beam modulating device comprising: quadrupole alternating electric field containment means including two pairs of parallel elongated electrodes centered around the longitudinal axis thereof for providing two dimensional transverse containment of an electron beam, said pairs of electrodes being divided into longitudinal sections by insulation means; first electric circuit means connected by resonant means to each of said sections for energizing said electrodes for alternating electric field containment at a frequency and voltage dependent upon the charge to mass ratio of the electrons and on the lateral spacing of the containment means so that the beam is bound to the axis by alternate gradient focusing; second electric circuit means for impressing a second alternating electric field establishing voltage at a lower frequency to a first of said sections to impart relatively small transverse oscillations to the beam; third electric circuit means for impressing an amplifying alternating electric field establishing voltage to a second of said sections at a frequency twice that of the lowest component frequency of oscillation of the beam to increase the transverse oscillations of the beam as a function of the deflection imparted to the beam in said first section; and means for detecting the character of said increased transverse oscillations.

21. An electron beam modulating device comprising: quadrupole alternating electric field containment means including two pairs of parallel elongated electrodes centered around the longitudinal axis thereof for providing two dimensional transverse containment of an electron beam, said pairs of electrodes being divided into longitudinal sections by insulation means; first electric circuit means connected by resonant means to each of said sections for energizing said electrodes for alternating electric field containment at a frequency and voltage dependent upon the charge to mass ratio of the electrons and on the lateral spacing of the containment means so that the beam is bound to the axis by alternate gradient focusing; second electric circuit means for impressing a second alternating electric field establishing voltage at a lower frequency to a first of said sections to impart relatively small transverse oscillations to the beam; third electric circuit means for impressing an amplifying alternating electric field establishing voltage to a second of said sections at a frequency twice that of one of the component frequencies of oscillation of the beam to increase the transverse oscillations of the beam as a function of the deflection imparted to the beam in said first section; and means for detecting the character of said increased transverse oscillations.

22. A charged particle beam modulating device comprising: alternating electric field containment means for providing two dimensional transverse containment of the beam; electric circuit means connected by impedance matching means for energizing said containment means at a first frequency and at a voltage dependent upon the charge to mass ratio of the particles of the beam and the relative transverse spacing of said containment means so that the beam of particles is bound to the longitudinal axis thereof by alternate gradient focusing; and a pair of parallel alternating electric field driving electrodes positioned coaxial with and along zero potential regimes of said containment means, said pair of driving electrodes being thus electrostatically balanced relative to said containment means.

23. A charge particle beam tube comprising: a beam source for providing charge particles of a determinable charge to mass ratio; an accelerating and focusing electrode for directing the beam along the longitudinal axis of the tube; an anode receptive of the beam; alternating electric field containment means for providing two dimensional containment of the beam about the axis; first electric circuit means for energizing said containment means at a frequency and voltage dependent upon the charge to mass ratio of the particles; a pair of parallel alternating electric field driving electrodes positioned coaxial with and along zero potential regimes of said containment means and being thus electrostatically balanced relative thereto; second electric circuit means for impressing a second alternating electric field establishing voltage on said said pair to impart transverse oscillations to the beam; and means for detecting the character of said transverse oscillations.

24. A charged particle beam modulating device comprising: longitudinal quadrupole alternating electric field containment means including pairs of electrodes diametrically positioned about an axis for providing two dimensional transverse containment of a charged particle beam; first electric circuit means connected by impedance matching means for energizing said pairs at a first frequency and at a voltage depending upon the charge to mass ratio of the particles of the beam and the relative transverse spacing of said pairs so that the beam of particles is bound to the axis of said pairs by alternate gradient focusing; a pair of parallel alternating electric field driving electrodes positioned coaxial with and along zero potential regimes of said containment means, said pair of driving electrodes being thus electrostatically balanced relative to said pairs of containment electrodes; second electric circuit means for impressing a second alternating electric field establishing voltage on said pair of driving electrodes to impart transverse oscillations to the beam; and means for detecting the character of said transverse oscillations.

25. A charged particle beam modulating device comprising: longitudinal quadrupole alternating electric field containment means including pairs of electrodes diametrically positioned for providing two dimensonal transverse containment of a charged particle beam; first electric circuit means connected by impedance matching means for energizing said pairs at a first frequency and at a voltage dependent upon the charge to mass ratio of the particles of the beam and the relative transverse spacing of said pairs so that the beam is bound to the axis of said pairs by alternate gradient focusing; a pair of oriented parallel alternating electric field driving electrodes positioned in a first section of and coaxial with and along zero potential regimes of said containment means, said pair of driving electrodes being thus electrostatically balanced relative to said pairs of containment electrodes; second electric circuit means for impressing a second alternating electric field establishing voltage to said pair of driving electrodes in said first section to impart transverse oscillations to said beam at a frequency which is a function of said first frequency, with said function being dependent on the magnitude of the alternate gradient forcusing voltage and the spacing of said containment means; another pair of parallel voltage energized electrodes positioned in a second section of and coaxial with and along zero potential regimes of said containment means; and third electric circuit means connected to said another pair in said second section for detecting the character of said transverse oscillations.

26. A charged particle beam modulating device comprising: quadrupole alternating electric field containment means including two pairs of parallel elongated electrodes centered around the longitudinal axis thereof for providing two dimensional transverse containment of a charged particle beam, said pairs of electrodes being operable as separate longitudinal sections; first electric means connected to each of said sections for energizing said containment means at a first frequency and voltage dependent upon the charge to mass ratio of the charged particles and on the lateral spacing of said containment means so that the beam is bound to the axis by alternate gradient focusing; a pair of longitudinal driving electrodes coaxially positioned in a first of said sections; second electric circuit means connected for impressing a second alternating electric field establishing voltage at a second lower frequency to said driving electrodes to impart relatively small transverse oscillations to the beam; a quadrupole system of amplifying electrodes coaxially positioned in a second of said sections; third electric circuit means for impressing an amplifying voltage to said containment means to increase the transverse oscillations of the beam as a function of the deflection imparted to the beam in said first section; and means for detecting the character of said increased transverse oscillations.

27. A charged particle beam modulating device comprising: quadrupole alternating electric field containment means including two pairs of parallel elongated electrodes centered around the longitudinal axis thereof for providing two dimensional transverse containment of a charged particle beam, said pairs of electrodes being operable as separate longitudinal sections; first electric circuit means connected by resonant means to each of said sections for energizing said containment means at a first frequency and voltage dependent upon the charge to mass ratio of the charged particles and on the lateral spacing of said containment means so that the beam is bound to the axis by alternate gradient focusing; a pair of longitudinal driving electrodes coaxially positioned in a first of said sections; second electric circuit means connected for impressing a second alternating electric field establishing voltage at a second lower frequency to said driving electrodes to impart relatively small transverse oscillations to the beam; a quadrupole system of amplifying electrodes coaxially positioned in a second of said sections; third electric circuit means for impressing an amplifying voltage to said containment means at a frequency twice that of one of the component frequencies of oscillation of the beam to increase the transverse oscillations of the beam as a function of the deflection imparted to the beam in said first section; and means for detecting the character of said increased transverse oscillations.

28. An electron beam tube comprising: an electron gun for providing a beam of electrons; an accelerating and focusing electrode for directing the beam at a relatively low speed along the axis of the tube; an anode receptive of the electrons; a quadrupole alternating electric field containment means centered around the axis for providing two dimensional containment of said beam, said containment means being divided into three longitudinal sections including a beam driving section, an amplifying section and a beam vibration detection section; first electric circuit means for energizing each section of said alternating electric field containment means to provide a containment field of a frequency resulting in alternate gradient focusing of said beam; a first pair of elongated parallel electrodes diametrically spaced from the axis in said beam driving section in an electrostatically balanced location relative to said containment means; second electric circuit means for energizing said elongated driving electrodes with a voltage at a frequency less than one-half the frequency of the containment voltage to cause said beam to vibrate about the axis; quadrupole amplifying parallel elongated electrodes in said beam amplifying section with one pair in the plane of said first pair and one pair in a plane perpendicular to that of said first pair; third electric circuit means connected to energize said quadrupole electrodes for amplifying said beam vibration; another pair of parallel elongated electrodes in said beam vibration detection section in the plane of and aligned with said first pair; and fourth electric circuit means connected to said another pair for detecting the character of the amplified beam vibration.

29. An electron beam coupler tube comprising: an electron gun for providing a beam of electrons directed along the longitudinal axis of the tube; an anode coaxial with said gun selectively receptive of said beam; quadrupole longitudinal alternating electric field containment electrodes including pairs of electrodes diametrically positioned relative to the axis for providing two dimensional transverse containment of said beam about the axis between said gun and said anode; first electric circuit means connected by resonant means for energizing said pairs of electrodes at a first frequency and at a voltage dependent upon the charge to mass ratio of said electrons and the relative transverse spacing of said pairs of containment electrodes so that the beam is attracted to the axis by alternate gradient focusing; a pair of parallel alternating electric field driving electrodes positioned in a first longitudinal section and along zero potential regimes of said containment electrodes, said pair of dricing electrodes being thus electrostatically balanced relative to said pairs of containment electrodes; second electric circuit means for impressing a second alternating electric field establishing voltage to said pair of driving electrodes in said first section to impart transverse oscillations to said beam at a frequency which is a function of said first frequency, with said function being dependent on the magnitude of the alternate gradient focusing voltage and the spacing of said containment electrodes; another pair of parallel alternating electric field detection electrodes positioned in a second section and along zero potential regimes of and coaxial with said containment electrodes; and third electric circuit means connected to a pair of detection electrodes in said second section for detecting the character of said transverse oscillations.

30. An electron beam tube comprising: an electron gun for providing a beam of electrons directed at a relatively low velocity along the axis of the tube; an anode receptive of the electrons; a quadrupole alternating electric field containment means centered around the axis for providing two dimensional transverse containment of said beam, said containment means being operable as at least two longitudinal coaxial sections including a beam driving section and a beam displacement detection section; first electric circuit means for energizing each section of said containment means to provide an alternating electric field containment field of a first frequency resulting in alternate gradient focusing of said beam; a first pair of elongated parallel driving electrodes diametrically spaced from the axis in said beam driving section in an electrostatically balanced location relative to said containment means; second electric circuit means for energizing said first pair with a voltage of a second frequency less than one-half said first frequency to cause said beam to vibrate about the axis; and a second pair of elongated parallel electrodes in the plane of and aligned with said first pair and in said beam displacement detection section for being energized by said beam vibration.

31. An electron beam tube comprising: an electron gun for providing a beam of electrons; an accelerating and focusing electrode for directing the beam at a relatively low speed along the axis of the tube; an anode receptive of the electrons; a quadrupole alternating electric field transverse containment means centered around the axis for providing two dimensional containment of said beam, said containment means being operable as at least two longitudinal sections including a beam driving section and a beam displacement detection section; first electric circuit means for energizing each section of said containment means to provide an alternating electric field containment field of a first frequency resulting in alternate gradient focusing of said beam; a first pair of elongated parallel driving electrodes diametrically spaced from the axis in said beam driving section in an electrostatically balanced location relative to said containment means; second electric circuit means for energizing said first pair with a voltage of a frequency less than one-half the frequency of the containment voltage to cause said beam to vibrate about the axis; a second pair of elongated parallel electrodes in the plane of and aligned with said first pair and in said beam displacement detection section for absorbing power in accordance with the character of the beam vibration; and insulation means positioned to isolate said first pair from said second pair.

32. An electron beam tube comprising: an electron gun for providing a beam of electrons at a relatively low speed directed along the axis of the tube; an anode receptive of the electrons; alternating electric field containment means centered around the axis for providing two dimensional containment of said beam, said containment means being operable as at least two longitudinal sections including a beam driving section and a beam displacement detection section; first electric circuit means for energizing each section of said alternating electric field containment means to provide an alternating electric field containment field of a first frequency resulting in alternate gradient focusing of said beam; a first pair of elongated parallel driving electrodes diametrically spaced from the axis in said beam driving section in an electrostatically balanced location relative to said containment means; second electric circuit means for energizing said driving electrodes with a voltage of a second frequency less than one-half said first frequency to cause said beam to vibrate about the axis; a unidirectional frequency control voltage means connected to said first circuit means to control selectively the frequencies at which said beam may vibrate; and a second pair of elongated parallel electrodes in said beam displacement detection section for being energized by said beam vibration.

33. A charged particle beam modulating device comprising: alternating electric field containment means including two pairs of parallel elongated electrodes centered around the longitudinal axis thereof for providing two dimensional transverse containment of a charged particle beam, said pairs of electrodes being operable as separate longitudinal sections; first electric means connected to each of said sections for energizing said containment means at a frequency and voltage dependent upon the charge to mass ratio of the charged particles and on the lateral spacing of said containment means so that the beam is bound to the axis by alternate gradient focusing; a pair of longitudinal driving electrodes coaxially positioned in a first of said sections; second electric circuit means connected for impressing a second alternating electric field establishing voltage at a lower frequency to said driving electrodes to impart relatively small transverse oscillations to the beam; third electric circuit means connected to said first electric circuit means for varying the voltage thereof to vary the frequency at which said second electric circuit means will be effective; a quadrupole system of amplifying electrodes coaxially positioned in a second of said sections; fourth electric circuit means for impressing an amplifying voltage to said containment means to increase the transverse oscillations of the beam as a function of the deflection imparted to the beam in said first section; and means for detecting the character of said increased transverse oscillations.

34. A charged particle beam modulating device comprising: alternating electric field containment means including two pairs of parallel elongated electrodes centered around the longitudinal axis thereof for providing two dimensional transverse containment of a charged particle beam, said pairs of electrodes being operable as separate longitudinal sections; first electric circuit means connected by resonant means to each of said sections for energizing said containment means at a first frequency and voltage dependent upon the charge to mass ratio of the charged particles and on the lateral spacing of said containment means so that the beam is bound to the axis by alternate gradient focusing; a pair of longitudinal driving electrodes coaxially positioned in a first of said sections; second electric circuit means connected for impressing a second alternating electric field establishing voltage at a second lower frequency to said driving electrodes to impart relatively small transverse oscillations to the beam; a quadrupole system of amplifying electrodes coaxially positioned in a second of said sections; third electric circuit means connected to said first electric circuit means for varying the magnitude of the voltage thereof to control the frequency relationship between said first and said second frequencies; fourth electric circuit means for impressing an amplifying defocusing voltage to said containment means to increase the transverse oscillations of the beam as a function of the deflection imparted to the beam in said first section; and means for detecting the character of said increased transverse oscillations.

35. An electron beam tube comprising: an electron gun for providing a beam of electrons directed along the longitudinal axis of the tube; an anode coaxial with said gun receptive of the electrons passing along the axis; longitudinal alternating electric field containment electrodes including pairs of electrodes diametrically positioned relative to the axis for providing two dimensional containment of said beam about the axis between said gun and said anode, said pairs of electrodes being divided by insulation means into longitudinal sections including a first section and a second section along the length of said containment means; first electric circuit means connected by resonant means for energizing said first section of said pairs of electrodes at a first frequency and at a voltage dependent upon the charge to mass ratio of said electrons and the relative spacing of said electrodes so that said beam is bound to the axis in each section by alternate gradient focusing; second electric circuit means for impressing a second alternating electric field producing voltage to one of said pairs of electrodes in said first section of said length to impart transverse oscillations to said beam at a second frequency which is a function of said first frequency, with said function being dependent upon the magnitude of the alternate gradient focusing voltage and the spacing of said electrodes; means for selectively applying a first unidirectional voltage to said containment means to control the relation between said frequencies; and third electric circuit means connected to said containment means in said second section of said length for impressing a second unidirectional voltage thereon to amplify said transverse oscillations.

36. A charged particle beam modulating device comprising: longitudinal quadrupole alternating electric field containment means including pairs of electrodes diametrically positioned for providing two dimensional transverse containment of the beam; first electric circuit means connected by impedance matching means for energizing said pairs at a first frequency and at a voltage dependent upon the charge to mass ratio of the particles of the beam and the relative transverse spacing of said pairs so that the beam of particles is attracted to the longitudinal axis of said pairs of alternate gradient focusing; a pair of oriented parallel alternating electric field driving electrodes positioned coaxial with a first section of said containment means, said pair of driving electrodes being electrostatically balanced relative to said pairs of containment electrodes; second electric circuit means for impressing a second alternating electric field producing voltage to said pair of driving electrodes in said first section to impart transverse oscillations to said beam at a frequency which is a function of said first frequency, with said function being dependent upon the magnitude of the alternate gradient focusing voltage and the spacing of said containment means; and third electric circuit means connected to said containment means for applying a unidirectional steering voltage thereto to deflect selectively the beam from this axis.

37. An electron beam modulating device comprising: quadrupole longitudinal alternating electric field containment means including pairs of electrodes diametrically positioned relative to the axis of the modulating device for providing an alternating electric field throughout sections thereof; first electric circuit means connected for energizing said pairs of electrodes so that a beam of electrons passing therethrough is attracted to the axis in each section by alternate gradient focusing; a pair of parallel alternating electric field driving electrodes in a first longitudinal section of said containment means, said pair of driving electrodes being electrostatically balanced relative to said containment means; second electric circuit means for impressing a second alternating electric field producing voltage on said pair of driving electrodes in said first section to cause lateral vibration of said beam; and third electric circuit means connected to said first section to cause an electrostatic field therein to deflect said beam from the axis.

38. An electron beam modulating device comprising: an electron gun for providing a beam of electrons; longitudinal alternating electric field containment means including electrodes diametrically positioned relative to the axis of the modulating device for providing two dimensional transverse containment of said beam throughout sections thereof; first electric circuit means including a unidirectional frequency control voltage source and being connected for energizing said containment means so that said beam is bound to the axis in each section by alternate gradient focusing; a first pair of parallel alternating electric field driving electrodes positioned in a first longitudinal section and along zero potential regimes of said containment means, said pair of driving electrodes being electrostatically balanced relative to said containment means; second electric circuit means for impressing a second alternating electric field producing voltage on said first pair of driving electrodes in said first section to cause a first lateral vibration of said beam; another pair of parallel alternating electric field driving electrodes in said first section along zero potential regimes of said containment means and in a plane perpendicular to that of said first pair; third electric circuit means for impressing a third alternating electric field producing voltage on said another pair to cause another lateral vibration of said beam; a first pair of longitudinal output electrodes in another section of the length of said containment means coplanar with said first pair of driving electrodes; a fourth electric circuit means connected to said first pair of output electrodes for detecting one of said lateral vibrations; and another pair of longitudinal output electrodes in said another section of the length of said containment means coplanar with said another pair of driving electrodes.

39. An electron beam tube comprising: an electron gun for providing a beam of electrons; alternating electric field containment means centered around the axis of the tube for providing two dimensional containment of said beam, said containment means being divided into four longitudinal sections including a beam driving section, two beam amplifying sections, and a beam vibration detection section; first electric circuit means for energizing each section of said containment means to provide an alternating electric field containment field of a first frequency resulting in alternate gradient focusing of said beam; first quadrupole elongated parallel electrodes diametrically spaced from the axis in said beam driving section in an electrostatically balanced location relative to said containment means; second electric circuit means for energizing one pair of said elongated driving electrodes with a driving voltage at a second frequency less than one-half said first frequency to cause said beam to vibrate about the axis in a first transverse plane; third electric circuit means for energizing the other pair of said elongated driving electrodes with a driving voltage at a third frequency less than one-half said first frequency to cause said beam to vibrate about the axis in a second transverse plane perpendicular to said first plane; second quadrupole elongated parallel electrodes in one of said beam amplifying sections; fourth electric circuit means connected to energize said second quadrupole electrodes for amplifying said beam vibration at said second frequency; third quadrupole elongated parallel electrodes in the other of said beam amplifying sections; fifth electric circuit means connected to energize said third quadrupole electrodes for amplifying said beam vibration at said third frequency; fourth quadrupole elongated parallel electrodes in said beam vibration detection section; and sixth electric circuit means connected to said fourth quadrupole electrodes for detecting the character of the amplified beam vibration at both said second and said third frequencies.

40. A charged particle beam detector vacuum tube apparatus comprising: a beam source; an elongated alternating electric field containment means for providing two dimensional containment of the beam centered around the longitudinal axis of said containment means, said containment means being divided into two longitudinal sections; first electric circuit means for energizing each section of said containment means at a frequency and voltage dependent upon the charge to mass ratio of the charged particles and the lateral spacing of said containment means so that the beam is attracted to the axis by alternate gradient focusing; second electric circuit means receptive of an alternating signal for impressing a second alternating electric field producing voltage in the first of said sections to impart relatively small transverse oscillations to the beam; third electric circuit means for impressing an amplifying voltage in a second of said sections to increase the lateral deflection of the beam as a function of said relatively small transverse oscillations; means connected to receive the beam from said second section for detecting the character of said increased lateral deflection; and means for applying a variable unidirectional frequency control voltage to said containment means to vary selectively the frequency receptivity of said second electric circuit means.

41. A charged particle beam vacuum tube comprising: a beam source for providing a beam of charged particles of a determinable charge to mass ratio; an anode receptive of said beam; alternating electric field containment means for providing two dimensional transverse containment of said beam about the axis between said source and said anode; first electric circuit means for energizing said containment means at a frequency and voltage dependent upon the charge to mass ratio of the particles so that said beam is attracted to the axis by a first alternating electric field; second electric circuit means for impressing a second transverse alternating electric field in a first section of the length of said containment means to impart relatively small lateral oscillations to said beam; third electric circuit means connected to said containment means for imparting thereto an electrostatic field which will selectively deflect said beam from the axis; fourth electric circuit means for impressing an amplifying alternating electric field in another section of the length of said containment means to increase the lateral oscillations of said beam as a function of said relatively small lateral oscillations; and means for recording the character of said increased lateral oscillations.

42. An electrical system useful in a signal amplifier, comprising the combination of:
 a particle containment tube;
 a charged particle gun within said tube for producing and directing a beam of particles generally along an axis of the tube;
 a target receptive of the beam;
 a multielement electrode structure surrounding said axis and extending along a substantial portion of said axis between said gun and said target, said electrode structure comprising a first set of electrically distinct elements situated to produce, when electrically energized, electric fields generally perpendicular in a first direction to said axis and a second set of electrically distinct elements situated to produce, when electrically energized, electric fields in a second direction generally perpendicular to said axis and transverse to said first direction;
 electric circuit means coupled to said electrode structure for electrically energizing said first and second set of elements to produce within said tube separate electric fields in transverse spaced relation to one another and alternately acting upon particles moving from said gun to said target to confine the path of said particles to said axis; and
 electric circuit means coupled to said electrode structure and responsive to a control signal to produce an alternating current electric field within said tube in a direction which is transverse to said axis and acting to alternately displace said particles from said axis in accordance with said control signal.

43. In an electrical signal amplifying system, the combination of:
 a particle containment tube;
 a charged particle gun within said tube for producing and directing a beam of particles generally along an axis of the tube;
 a target receptive of the beam;
 a multielement electrode structure surrounding said axis and extending along a substantial portion of said axis between said gun and said target, said electrode structure comprising a first set of electrically distinct elements situated to produce, when electrically energized, electric fields generally perpendicular in a first direction to said axis and a second set of elements situated to produce, when electrically energized, electric fields in a second direction generally perpendicular to said axis and transverse to said first direction;
 electric circuit means coupled to said electrode structure for electrically energizing said first and second set of elements to produce within said tube separate electric fields in transverse spaced relation to one another and alternately acting upon particles moving from said gun to said target to confine the path of said particles to said axis;
 electric circuit means coupled to said tube and responsive to a signal to be amplified to displace alternatively said particles from said axis to and fro along a given direction in accordance with the signal to be amplified; and
 means coupled to said electrode structure adjacent said target and responsive to said movement of said particles to and fro along said given direction for delivering energy representing the amplified signal.

44. In an electrical signal amplifying system, the combination of:
 a particle containment tube;
 a charged particle gun within said tube for producing and directing a beam of particles generally along an axis of the tube;
 a target receptive of the beam;
 a multielement electrode structure surrounding said axis and extending along a substantial portion of said axis between said gun and said target, said electrode structure comprising a first set of electrically distinct elements situated to produce, when electrically energized, electric fields generally perpendicular in a first direction to said axis and a second set of elements situated to produce, when electrically energized, electric fields in a second direction generally perpendicular to said axis and transverse to said first direction;
 electric circuit means coupled to said electrode structure for electrically energizing said first and second set of elements to produce within said tube separate electric fields in transverse spaced relation to one another and alternately acting upon particles moving from said gun to said target to confine the path of said particles to said axis;
 electric circuit means coupled to said electrode structure adjacent said gun and responsive to a signal to be amplified to produce an alternating electric current field within said tube which is transverse in a given direction to said axis and acting to displace alternately said particles from said axis in accordance with the signal to be amplified; and
 means coupled to said electrode structure adjacent said target and responsive to movement of particles to and fro along said given direction for delivering energy representing the amplified signal.

45. In an electrical signal amplifying system, the combination of:
 a particle containment tube;
 a charged particle gun within said tube for producing and directing a beam of particles generally along an axis of the tube;
 a target receptive of the beam;
 a multielement electrode structure surrounding said axis and extending along a substantial portion of said axis between said gun and said target, said electrode structure comprising a first set of electrically distinct elements situated to produce, when electrically energized, electric fields generally perpendicular in a first direction to said axis and a second set of elements situated to produce, when electrically energized, electric fields in a second direction generally perpendicular to said axis and transverse to said first direction;
 first electric circuit means coupled to said electrode structure for electrically energizing said first and second set of elements to produce within said tube separate electric fields in transverse spaced relation to one another and alternately acting upon particles moving from said gun to said target to confine the path of said particles to said axis;

second electric circuit means coupled to a first portion of said electrode structure adjacent said gun and responsive to a signal to be amplified to produce an alternating electric current field within said tube which is transverse in a given direction to said axis and acting to alternately displace said particles from said axis in accordance with the signal to be amplified;

means coupled to a second portion of said electrode structure adjacent said target and responsive to movement of particles to and fro along said given direction for delivering energy representing the amplified signal; and third electric circuit means coupled to a third portion of said electrode structure intermediate said first and second portions to produce a periodic alternating electric current field within said tube which is transverse to said axis in said given direction.

References Cited in the file of this patent

UNITED STATES PATENTS

| | | |
|---|---|---|
| 2,650,956 | Heising | Sept. 1, 1953 |
| 2,832,001 | Adler | Apr. 22, 1958 |
| 2,834,908 | Kompfner | May 13, 1958 |
| 2,878,413 | Adler | Mar. 17, 1959 |

FOREIGN PATENTS

| | | |
|---|---|---|
| 874,653 | France | May 18, 1942 |

OTHER REFERENCES

Article by R. Adler et al., pages 1756 and 1757, Proc. IRE for October 1958, vol. 46, No. 10.

"Theory of Fast-Wave Parametric Amplification," Tech. Memorandum No. 540, by C. C. Johnson, Hughes Aircraft Co., Research Laboratories, for February 1959, pages 1 to 45.

UNITED STATES PATENT OFFICE
CERTIFICATE OF CORRECTION

Patent No. 3,147,445                          September 1, 1964

Ralph F. Wuerker et al.

It is hereby certified that error appears in the above numbered patent requiring correction and that the said Letters Patent should read as corrected below.

Column 12, lines 51 to 53, equation "(23)" for that portion of the equation reading $$\left(\frac{C_{2n}}{C_0}\right)\frac{C_{2n}}{C_0} \quad\quad \text{read} \quad\quad \left(\frac{C_{2n}}{C_0}\right)^2 \frac{C_{2n}}{C_0}$$

column 13, lines 29 and 30, equation "(28)", for that portion of the equation reading $$x_{max}.i_b \text{ watts} \quad\quad \text{read} \quad\quad \left(x_{max}\right)^2 i_b \text{ watts}$$

Signed and sealed this 22nd day of February 1966.

(SEAL)
Attest:

ERNEST W. SWIDER                        EDWARD J. BRENNER
Attesting Officer                       Commissioner of Patents